United States Patent
Yazawa et al.

(10) Patent No.: US 7,113,367 B2
(45) Date of Patent: Sep. 26, 2006

(54) FENIRE SOFT MAGNETIC FILM AND THIN FILM MAGNETIC HEAD USING THE SAME FOR SIMULTANEOUS ADJUSTMENT OF RESISTIVITY AND SATURATED MAGNETIC FLUX DENSITY

(75) Inventors: Hisayuki Yazawa, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 382 days.

(21) Appl. No.: 10/660,165

(22) Filed: Sep. 10, 2003

(65) Prior Publication Data

US 2004/0051999 A1   Mar. 18, 2004

(30) Foreign Application Priority Data

Sep. 13, 2002  (JP)  ............... 2002-267733

(51) Int. Cl.
*G11B 5/147*  (2006.01)
*C23C 18/54*  (2006.01)

(52) U.S. Cl. ..................................... 360/126
(58) Field of Classification Search .............. 360/126, 360/125, 110
See application file for complete search history.

(56) References Cited

U.S. PATENT DOCUMENTS

| | | | | |
|---|---|---|---|---|
| 6,118,629 A * | 9/2000 | Huai et al. | ........... | 360/126 |
| 6,183,881 B1 | 2/2001 | Shimizu | ........... | 428/611 |
| 6,262,867 B1 | 7/2001 | Sano et al. | ........... | 360/126 |
| 6,369,984 B1 | 4/2002 | Sato | ........... | 360/126 |
| 6,376,108 B1 | 4/2002 | Otagiri et al. | ........... | 428/212 |
| 6,586,069 B1 * | 7/2003 | Dykes et al. | ........... | 428/833.2 |
| 2002/0008936 A1 | 1/2002 | Kawasaki et al. | ........... | 360/126 |
| 2002/0071207 A1 | 6/2002 | Kanada et al. | ........... | 360/120 |
| 2002/0106533 A1 | 8/2002 | Kudo et al. | ........... | 428/810 |

FOREIGN PATENT DOCUMENTS

| | | |
|---|---|---|
| EP | 1 132 499 | 9/2001 |
| JP | 6-36233 | 2/1994 |
| JP | 6-116748 | 4/1994 |
| JP | 8-212512 | 8/1996 |
| JP | 9-63016 | 3/1997 |
| JP | 2000-58364 | 2/2000 |
| JP | 2000-235911 | 8/2000 |
| WO | WO 03/0625501 | 7/2003 |

OTHER PUBLICATIONS

R.E. Jones Jr., "Fabrication of Film Heads with High Moment Materials", 1998, Elsevier Science Ltd., Acta Mater. v. 46 No. 11 pp. 3805-3812.*
UK search report GB 0321138.0, Dec. 15, 2003.

* cited by examiner

*Primary Examiner*—Julie Anne Watko
(74) *Attorney, Agent, or Firm*—Brinks Hofer Gilson & Lione

(57) ABSTRACT

A soft magnetic film composed of an alloy represented by the formula FeNiRe is used for forming a lower core layer and/or an upper core layer. Since having a high saturated magnetic flux density, a high resistivity, superior corrosion resistance, and a small loss in a high frequency signal region, the FeNiRe alloy can be used for forming a highly reliable thin film magnetic head.

6 Claims, 10 Drawing Sheets

FENIRE SOFT MAGNETIC FILM AND THIN FILM MAGNETIC HEAD USING THE SAME FOR SIMULTANEOUS ADJUSTMENT OF RESISTIVITY AND SATURATED MAGNETIC FLUX DENSITY

BACKGROUND OF THE INVENTION

1. Field of the Invention

The present invention relates to a soft magnetic film which is used as a core material, a magnetic pole material, or the like of a thin film magnetic head and which is composed of an FeNiRe alloy having both a high resistivity and a high saturated magnetic flux density, and to a thin film magnetic head using the soft magnetic film described above.

2. Description of the Related Art

In planar magnetic elements such as a thin film magnetic head or a thin film inductor, a NiFe alloy (permalloy) has been used as a magnetic material in many cases.

Since, for example, the NiFe alloy mentioned above has relatively superior soft magnetic properties and is easily obtained by plating, the NiFe alloy has become one of magnetic materials which are frequently used.

However, concomitant with recent improvement in high frequency current performance of a planar magnetic element, an eddy current loss in a high frequency current region becomes a problem.

In order to reduce the eddy current loss, a soft magnetic film having a high resistivity is advantageously used.

For example, in Japanese Unexamined Patent Application Publication No. 8-212512 (Patent publication 1), in order to reduce the eddy current loss in high frequency recording, a thin film magnetic head composed of a soft magnetic film having a resistivity of 40 $\mu\Omega\cdot$cm or more is disclosed, in which the soft magnetic film is formed by adding molybdenum (Mo) to a binary NiFe alloy.

Patent Publication 1

Japanese Unexamined Patent Application Publication No. 8-212512 (pp. 11 to 12, and FIGS. 16 to 18)

Patent Publication 2

Japanese Unexamined Patent Application Publication No. 9-63016 (pp. 5 to 6, and FIG. 5)

Patent Publication 3

Japanese Unexamined Patent Application Publication No. 2000-235911 (pp. 3 to 4, and FIG. 1)

Patent Publication 4

Japanese Unexamined Patent Application Publication No. 2000-58364

However, according to the FeNiMo alloy film disclosed in Japanese Unexamined Patent Application Publication No. 8-212512, when the composition ratio of Fe to Ni is more than 60%, the saturated magnetic flux density Bs is rapidly decreased. As a result, the saturated magnetic flux density Bs of the FeNiMo alloy film disclosed in Japanese Unexamined Patent Application Publication No. 8-212512 is decreased to 1.6 tesla (T) or less. From a theoretical point of view, when the Fe content of an FeNiMo alloy film is increased, the saturated magnetic flux density thereof is also increased; however, it is believed that, according to Japanese Unexamined Patent Application Publication No. 8-212512, a stable FeNiMo alloy film having a composition ratio of Fe to Ni of more than 60% cannot be formed. According to the patent described above, this FeNiMo alloy is formed by direct current plating.

In addition, according to Patent Publications 2 to 4, although FeNiMo alloy films are also disclosed, both of them are not stable FeNiMo alloy films having a composition ratio of Fe to Ni of more than 60%.

However, concomitant with the recent trend toward higher recording density, in order to improve recording density, it has been desired that the saturated magnetic flux density Bs is further increased.

In addition, there has been a problem in that an FeNiMo alloy, which is composed of NiFe and Mo incorporated thereinto, has inferior corrosion resistance to that of a NiFe alloy.

SUMMARY OF THE INVENTION

Accordingly, the present invention was made to solve the problems described above, and an object of the present invention is to provide a soft magnetic film composed of an FeNiRe alloy, a thin film magnetic head using this thin film magnetic head, and a method for manufacturing a soft magnetic film, the FeNiRe alloy stably having a high saturated magnetic flux density Bs together with a high resistivity and superior corrosion resistance.

A soft magnetic film in accordance with one aspect of the present invention comprises an alloy which is represented by the formula FeNiRe and which is formed by plating.

According to the present invention, in order to obtain a soft magnetic film having both a high saturated magnetic flux density and a high resistivity, instead of adding an element such as Mo to NiFe as in the case performed in the past, a soft magnetic film composed of an FeNiRe alloy, which is formed by adding Re to NiFe, is used.

According to the soft magnetic film of the present invention, the resistivity is increased when Re is contained therein.

In addition, the saturated magnetic flux density Bs of a soft magnetic film which contains Fe primarily depends on the Fe content, and the Bs is increased as the composition ratio of Fe is increased. The reason for this relates to atom's magnetic moment indicated by the Slater-Pauling curve. However, when the composition ratio of Fe is increased to a certain level or more, it is believed that a growth process of a plating film is interfered with, a dense crystal cannot be formed, and the Bs described above is decreased.

In the present invention, the soft magnetic film described above is formed by plating. By plating, the thickness of the soft magnetic film can be relatively freely changed, and when frame plating is used, the soft magnetic film described above can be formed so as to have a large thickness and an optional shape. In addition, the soft magnetic film formed by plating tends to have a uniform thickness as compared to that of a soft magnetic film formed by vacuum deposition such as sputtering. When the thickness of the soft magnetic film is increased, the difference in uniformity of film thickness between the soft magnetic film formed by plating and that formed by vacuum deposition such as sputtering is increased.

In particular, in the present invention, since pulse current plating is used, and the composition of a plating bath is appropriately controlled, a soft magnetic film composed of an FeNiRe alloy having both a high Fe content and a high saturated magnetic flux density can be obtained.

Accordingly, a soft magnetic film can be obtained which has a high saturated magnetic flux density capable of fulfilling the requirement for a higher recording density of a magnetic head and which has a high resistivity $\rho$ necessary for reducing the eddy current loss in a high frequency current region.

Furthermore, the FeNiRe alloy has superior corrosion resistance.

In addition, the FeNiRe alloy of the present invention is preferably represented by the formula $(Fe_xNi_y)_aRe_b$, wherein $0.54 \leq x \leq 0.74$ and $x+y=1$ are satisfied when x and y are on a mass percent ratio basis, and $0 < b \leq 10.1$ and $a+b=100$ are satisfied when a and b are on a mass percent basis.

In the present invention, by controlling the composition ratio of the FeNiRe alloy, a soft magnetic film having a resistivity in the range of from more than 50 to 98 μΩ·cm can be obtained.

In addition, according to the present invention, even when the soft magnetic film has a high resistivity, such as in the range of from more than 50 to 98 μΩ·cm or more, the saturated magnetic flux density Bs can be increased. In particular, a soft magnetic film can be obtained having a resistivity in the range of from more than 50 to 98 μΩ·cm and a saturated magnetic flux density Bs in the range of from 1.14 to less than 1.55 (T).

The soft magnetic film composed of the FeNiRe alloy of the present invention may have a coercive force Hc of 120 A/m or less in a magnetization difficult axis direction.

In addition, according to the present invention, by controlling the composition ratio of the FeNiRe alloy, a soft magnetic film having a saturated magnetic flux density Bs in the range of from 1.75 to less than 1.89 (T) can be obtained. In the present invention, even when the soft magnetic film has a high saturated magnetic flux density in the range of from 1.75 to less than 1.89 (T), the resistivity ρ thereof can be increased. In particular, a soft magnetic film can be obtained having a saturated magnetic flux density Bs in the range of from 1.75 to less than 1.89 (T) and a resistivity in the range of from more than 34 to 76 μΩ·cm.

The saturated magnetic flux density Bs of the soft magnetic film of the present invention is defined by the mass percent ratio of Fe to Ni and the mass percent of Re. As the mass percent of Re is increased, the resistivity ρ of the FeNiRe alloy is increased, and hence the eddy current loss in a high frequency region can be effectively reduced; however, the saturated magnetic flux density is decreased.

The relationship of the mass percent ratio of Fe to Ni and the Re content of an FeNiRe alloy with the resistivity ρ and the saturated magnetic flux density Bs will be described in detail in an example described below.

In addition, a thin film magnetic head in accordance with another aspect of the present invention comprises: a lower core layer composed of a magnetic material; an upper core layer formed above the lower core layer with a magnetic gap provided therebetween; and a coil layer applying a recording magnetic field to the two core layers, wherein at least one of the core layers is formed of a soft magnetic film composed of the FeNiRe alloy described above.

The thin film magnetic head according to the present invention preferably further comprises a bulged lower magnetic pole layer on the lower core layer at a face opposing a recording medium. In particular, the lower magnetic pole layer is preferably formed of a soft magnetic film composed of the FeNiRe alloy described above.

Alternatively, the thin film magnetic head according to the present invention may further comprise a magnetic pole portion which is disposed between the lower core layer and the upper core layer, the width of the magnetic pole portion in a track width direction being set to smaller than that of each of the lower core layer and the upper core layer.

In the thin film magnetic head described above, the magnetic pole portion described above is composed of a lower magnetic pole layer in contact with the lower core layer, an upper magnetic pole layer in contact with the upper core layer, and a gap layer located between the lower magnetic pole layer and the upper magnetic pole layer, or is composed of an upper magnetic pole layer in contact with the upper core layer and a gap layer located between the upper magnetic pole layer and the lower core layer, and at least one of the lower core layer, the upper core layer, the lower magnetic pole layer, and the upper magnetic pole layer is preferably formed of a soft magnetic film composed of the FeNiRe alloy described above.

Alternatively, the upper magnetic pole layer and/or the lower magnetic pole layer is only formed of a soft magnetic film of the FeNiRe alloy described above, and the upper core layer and the lower core layer may be formed of a soft magnetic film composed of an alloy other than the FeNiRe alloy described above.

In addition, at least a part of the core layers, which is adjacent to the magnetic gap, comprises at least two magnetic layers, or at least one of the magnetic pole layers comprises at least two magnetic layers, and at least one of the magnetic layers, which is disposed away from the magnetic gap, is preferably formed of a soft magnetic film composed of the FeNiRe alloy described above.

As described above, the FeNiRe alloy used as the soft magnetic film of the present invention has both a high saturated magnetic flux density Bs and a high resistivity. When the soft magnetic film described above is used as a core material, an upper magnetic pole layer, or a lower magnetic pole layer of a thin film magnetic head, while the magnetic flux can be concentrated in the vicinity of the gap, the eddy current loss can be reduced in a high frequency region, and hence the trend toward higher recording density can be facilitated.

DESCRIPTION OF THE PREFERRED EMBODIMENTS

Figure 1:
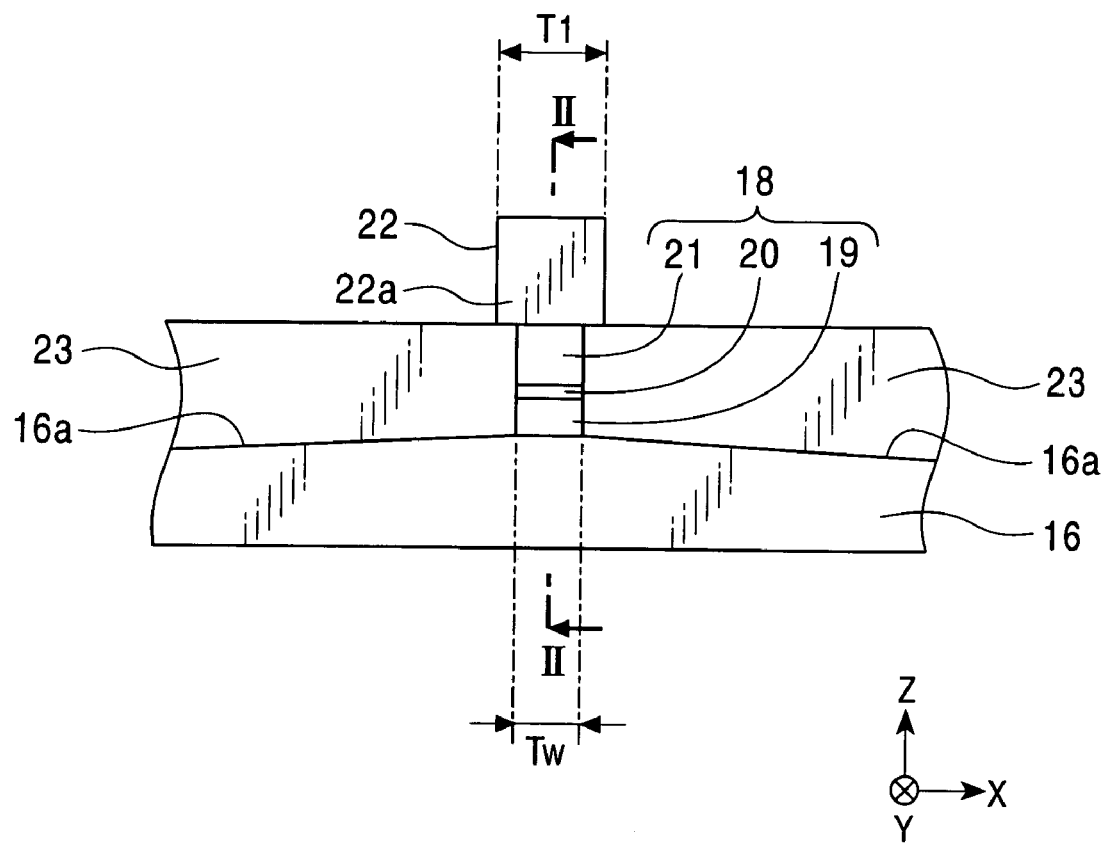
FIG. 1 is a partial front view of a thin film magnetic head according to a first embodiment of the present invention.
Figure 2:
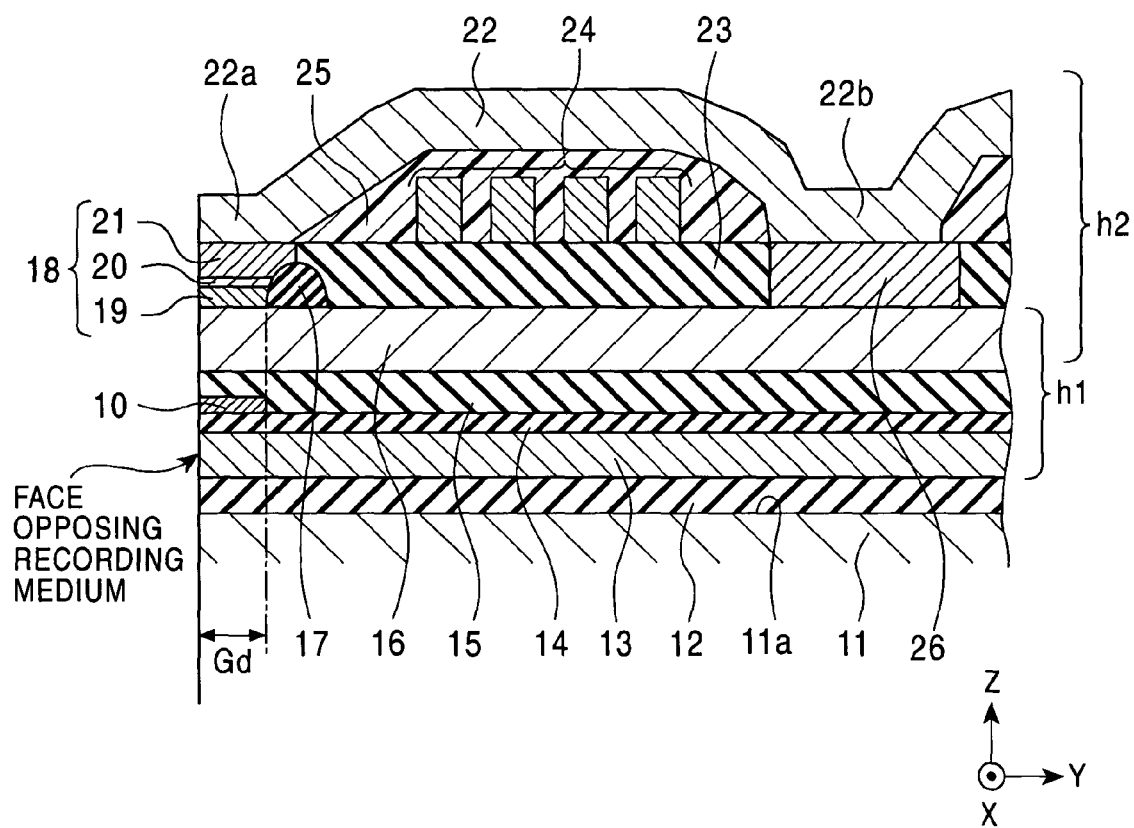
FIG. 2 is a vertical cross-sectional view of the thin film magnetic head shown in FIG. 1.

FIG. 1 is a partial front view of a thin film magnetic head of a first embodiment according to the present invention, and FIG. 2 is a vertical cross-sectional view of the thin film magnetic head shown in FIG. 1 taken along the line II—II, the head being viewed along the arrow.

The thin film magnetic head of the present invention is provided on a trailing-side end surface 11a of a slider 11, which slider 11 is composed of a ceramic material and which forms a floating head, and an inductive head h2 for writing is provided on an MR head h1 to form an MR/inductive composite thin film magnetic head (hereinafter simply referred to as a "thin film magnetic head").

The MR head h1 detects a leakage magnetic field from a recording medium such as a hard disc by using a magnetoresistive effect so as to read a recording signal.

As shown in FIG. 2, above the trailing-side end surface 11a of the slider 11 described above, a lower shield layer 13 composed of a magnetic material such as NiFe is formed with an $Al_2O_3$ film 12 provided therebetween, and a lower gap layer 14 composed of an insulating material is further formed on the lower shield layer 13.

On the lower gap layer 14, a magnetoresistive effect element 10, such as an anisotropic magnetoresistive effect (AMR) element, a giant magnetoresistive effect (GMR) element, or a tunnel magnetoresistive effect (TMR) element, is formed from a face opposing a recording medium in a height direction (Y direction in the figure), and on the magnetoresistive effect element 10 and the lower gap layer 14, an upper gap layer 15 composed of an insulating material is provided. Furthermore, on the upper gap layer 15, an upper shield layer 16 composed of a magnetic material such as NiFe is provided. The MR head h1 has a multilayer structure composed of the layers described above, that is, from the lower shield layer 13 to the upper shield layer 16.

Next, in the embodiment shown in FIGS. 1 and 2, the upper shield layer 16 is also used as a lower core layer of the inductive head h2, and on this lower core layer 16, a Gd determining layer 17 is formed, and a gap depth (Gd) is defined by the dimension from the face opposing a recording medium to the front end portion of the Gd determining layer 17. The Gd determining layer 17 is formed, for example, of an insulating material.

In addition, as shown in FIG. 1, an upper surface 16a of the lower core layer 16 is an inclined surface which is gradually inclined downward from a base end of a magnetic pole portion 18 to both sides in a track width direction (X direction in the figure), and hence the generation of side fringe can be suppressed.

As shown in FIG. 2, the magnetic pole portion 18 is formed over the lower core layer 16 to the GD determining layer 17 from the face opposing a recording medium.

The magnetic pole portion 18 has a multilayer structure composed of a lower magnetic pole layer 19, a nonmagnetic gap layer 20, and an upper magnetic pole layer 21 provided in that order from the bottom.

The lower magnetic pole layer 19 is directly formed on the lower core layer 16 by plating. In addition, the gap layer 20 formed on the lower magnetic pole layer 19 is preferably formed of a nonmagnetic metal material which can be formed by plating. In particular, at least one material selected from the group consisting of NiP, NiPd, NiW, NiRe, Au, Pt, Rh, Pd, Ru, and Cr is preferably used.

As a particular embodiment of the present invention, NiP is used for the gap layer 20. The reason for this is that the gap layer 20 formed of NiP can be appropriately put in a nonmagnetic state.

In addition, the upper magnetic pole layer 21 formed on the gap layer 20 is magnetically coupled with an upper core layer 22 formed on the upper magnetic pole layer 21.

When the gap layer 20 is formed of a nonmagnetic metal material which can be formed by plating, as described above, the lower magnetic pole layer 19, the gap layer 20, and the upper magnetic pole layer 21 can be sequentially formed by plating.

In addition, the magnetic pole portion 18 may be formed of two layers, that is, the gap layer 20 and the upper magnetic pole layer 21.

As shown in FIG. 1, the width dimension of the magnetic pole portion 18 in the track width direction (X direction in the figure) is a track width Tw.

As shown in FIGS. 1 and 2, an insulating layer 23 is formed at both sides of the magnetic pole portion 18 in the track width direction (X direction in the figure) and at the rear side thereof in the height direction (Y direction in the figure). The upper surface of the insulating layer 23 is formed to be flush with the upper surface of the magnetic pole portion 18.

As shown in FIG. 2, a coil layer 24 having a spiral pattern is formed on the insulating layer 23. In addition, the coil layer 24 is covered with an insulating layer 25 composed of an organic insulating material.

As shown in FIG. 2, the upper core layer 22 is pattern-formed, for example, by frame plating over the magnetic pole portion 18 to the insulating layer 25.

By plating, the thickness of the upper core layer 22 and/or the lower core layer 16 can be relatively freely changed, and the upper core layer 22 and/or the lower core layer 16 can be formed as a thick soft magnetic film having an optional shape.

As shown in FIG. 1, a front end portion 22a of the upper core layer 22 is formed to have a width dimension T1 in the track width direction at the face opposing a recording medium, and the width dimension T1 is formed larger than the track width Tw.

In addition, as shown in FIG. 2, a base end portion 22b of the upper core layer 22 is formed so as to be directly in contact with a coupling layer (back gap layer) 26 of a magnetic material which is formed on the lower core layer 16.

In the present invention, the upper core layer 22 and/or the lower core layer 16 is formed of a soft magnetic film of an alloy represented by the formula FeNiRe.

As a particular FeNiRe alloy, for example, $(Fe_xNi_y)_aRe_b$ may be mentioned in which $0.54 \leq x \leq 0.74$ and $x+y=1$ are satisfied when x and y are on a mass percent ratio basis, and $0 < b \leq 10.1$ and $a+b=100$ are satisfied when a and b are on a mass percent basis.

In the present invention, in order to form the upper core layer 22 and/or the lower core layer 16 using a soft magnetic film having both a high saturated magnetic flux density and a high resistivity, a soft magnetic film is used which is composed of an FeNiRe alloy formed by adding Re to NiFe.

Since the upper core layer 22 and/or the lower core layer 16 contains Re, the resistivity thereof is increased.

The saturated magnetic flux density Bs of a soft magnetic film containing Fe primarily depends on the Fe content, and the Bs is increased with increase of the composition ratio of Fe. The reason for this relates to atom's magnetic moment indicated by the Slater-Pauling curve. However, it is believed that when the composition ratio of Fe is increased to a certain level or more, a growth process of a plating film is interfered with, a dense crystal cannot be formed, and the Bs described above is decreased.

In a manufacturing method of the present invention, which will be described later, when pulse current plating is used, and a plating bath composition is appropriately controlled, a soft magnetic film composed of an FeNiRe alloy can be obtained which has a high composition ratio of Fe and which stably has the saturated magnetic flux density Bs. Hence, the upper core layer 22 and/or the lower core layer 16 can be formed of the soft magnetic film described above.

Accordingly, the upper core layer 22 and/or the lower core layer 16 can be obtained which has a high saturated magnetic flux density capable of fulfilling the requirement for a higher recording density of a magnetic head and a high resistivity ρ necessary for reducing the eddy current loss in a high frequency current region.

In addition, the upper core layer 22 and/or the lower core layer 16 composed of the FeNiRe alloy has superior corrosion resistance.

According to the present invention, by controlling the composition ratio of the FeNiRe alloy, the upper core layer 22 and/or the lower core layer 16 can be obtained which is composed of a soft magnetic film having a resistivity in the range of from more than 50 to 98 μΩ·cm.

In addition, in the present invention, even when the soft magnetic film has a high resistivity, such as in the range of from more than 50 to 98 μΩ·cm, the saturated magnetic flux density Bs can be increased. In particular, the upper core layer 22 and/or the lower core layer 16 can be obtained which is composed of a soft magnetic film having a resistivity in the range of from more than 50 to 98 μΩ·cm and a saturated magnetic flux density Bs in the range of from 1.14 to less than 1.55 (T).

In addition, according to the present invention, the coercive force Hc of a soft magnetic film in the magnetization difficult axis direction can be decreased to 120 A/m or less which is composed of the FeNiRe alloy for forming the upper core layer 22 and/or the lower core layer 16.

Alternatively, in the present invention, by controlling the composition ratio of the FeNiRe alloy, the upper core layer 22 and/or the lower core layer 16 can be obtained which is composed of a soft magnetic film having a saturated magnetic flux density Bs in the range of from 1.75 to less than 1.89 (T). In the present invention, even when the soft magnetic film has a high saturated magnetic flux density Bs in the range of from 1.75 to less than 1.89 (T), the resistivity ρ can be increased. In particular, the upper core layer 22 and/or the lower core layer 16 can be obtained which is composed of a soft magnetic film having a saturated magnetic flux density in the range of from 1.75 to less than 1.89 (T) and a resistivity in the range of from more than 34 to 76 μΩ·cm.

The saturated magnetic flux density Bs of the soft magnetic film of the present invention is defined by the mass percent ratio of Fe to Ni and the mass percent of Re. When the mass percent of Re is increased, the resistivity ρ of the FeNiRe alloy is increased, and the eddy current loss can be effectively reduced in a high frequency region; however, the saturated magnetic flux density is decreased.

The relationship of the mass percent ratio of Fe to Ni and the Re content of the FeNiRe alloy with the resistivity ρ and the saturated magnetic flux density Bs will be described in detail in the example described later.

As described above, the FeNiRe alloy of the present invention used as a soft magnetic film has both a high saturated magnetic flux density Bs and a high resistivity ρ. When the soft magnetic film described above is used as a core material of a thin film magnetic head, while the magnetic flux is concentrated in the vicinity of the gap, the eddy current loss can be reduced in a high frequency region, and hence the trend toward higher recording density can be facilitated.

The soft magnetic film formed of the FeNiRe alloy described above may also be used for a thin film magnetic head according to another embodiment.

Figure 3:
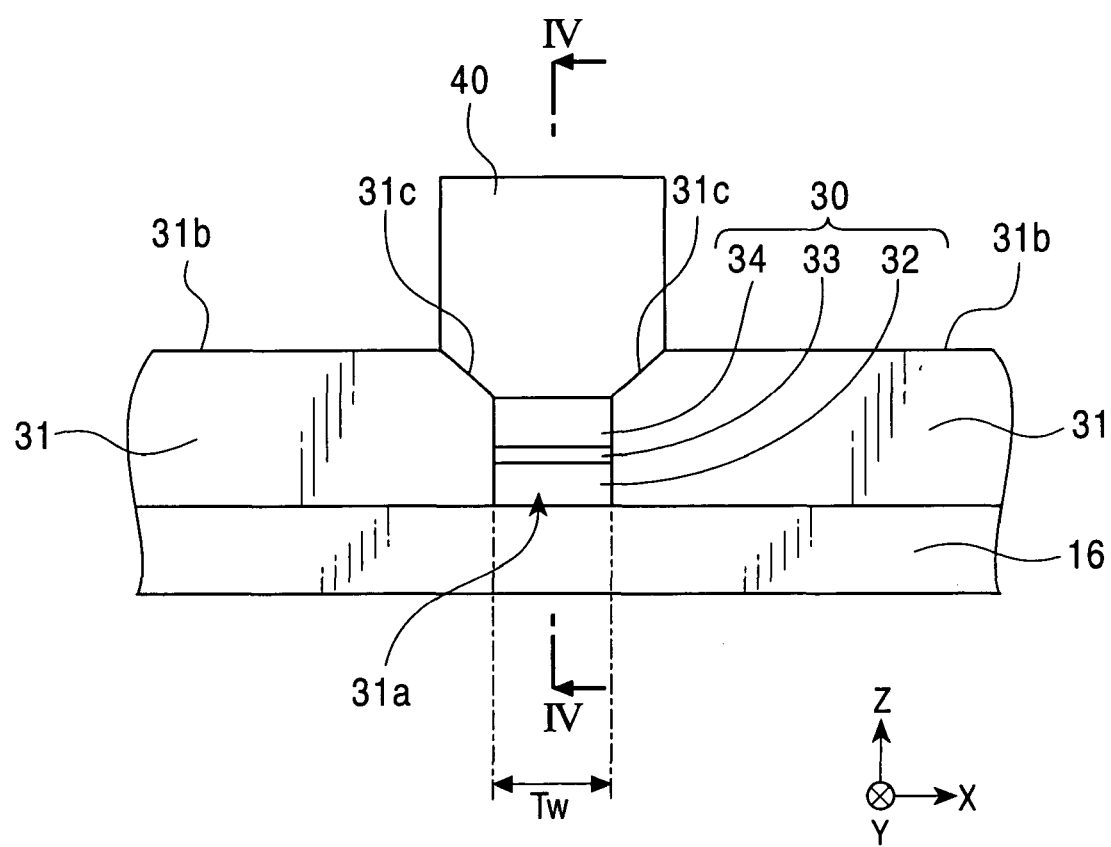
FIG. 3 is a partial front view of a thin film magnetic head according to a second embodiment of the present invention.
Figure 4:
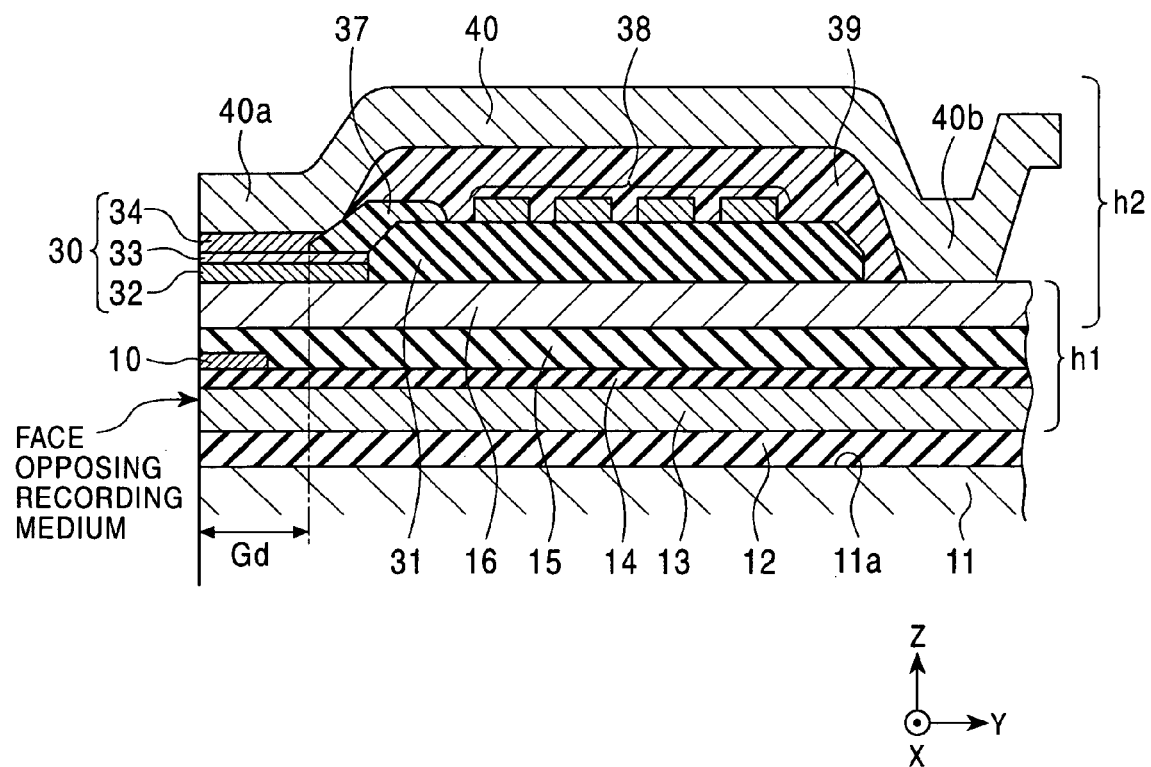
FIG. 4 is a vertical cross-sectional view of the thin film magnetic head shown in FIG. 3.

FIG. 3 is a partial front view showing the structure of a thin film magnetic head of a second embodiment according to the present invention, and FIG. 4 is a vertical cross-sectional view of the thin film magnetic head shown in FIG. 3 taken along the line IV—IV, the head being viewed along the arrow.

In this embodiment, the structure of the MR head h1 is the same as that shown in FIGS. 1 and 2.

As shown in FIG. 3, on the lower core layer 16, an insulating layer 31 is formed. In the insulating layer 31, a track width forming groove 31a is formed having a predetermined length from the face opposing a recording medium to the rear side in the height direction (Y direction in the figure). The track width forming groove 31a is formed to have the track width Tw at the face opposing a recording medium (see FIG. 3).

In the track width forming groove 31a, a magnetic pole portion 30 is formed having a lower magnetic pole layer 32, a nonmagnetic gap layer 33, and an upper magnetic pole layer 34 provided in that order from the bottom.

The lower magnetic pole layer 32 is formed directly on the lower core layer 16 by plating. In addition, the gap layer 33 provided on the lower magnetic pole layer 32 is preferably formed of a nonmagnetic metal material which can be formed by plating. In particular, at least one material selected from the group consisting of NiP, NiPd, NiW, NiRe, Au, Pt, Rh, Pd, Ru, and Cr is preferably used.

As a particular embodiment of the present invention, NiP is used for the gap layer 33. The reason for this is that the gap layer 33 formed of NiP can be appropriately put in a nonmagnetic state.

The magnetic pole portion 30 described above may be formed of two layers, that is, the gap layer 33 and the upper magnetic pole layer 34.

A gap depth (Gd) determining layer 37 is formed over the gap layer 33 to the insulating layer 31 from a position at a distance of the gap depth (Gd) away from the face opposing a recording medium.

Furthermore, the upper magnetic pole layer 34 formed on the gap layer 33 is magnetically coupled with an upper core layer 40 which is formed on the upper magnetic pole layer 34.

When the gap layer 33 is formed of a nonmagnetic metal material which can be formed by plating, as described above, the lower magnetic pole layer 32, the gap layer 33, and the upper magnetic pole layer 34 can be sequentially formed by plating.

As shown in FIG. 4, on the insulating layer 31, a coil layer 38 having a spiral pattern is formed. The coil layer 38 is covered with an insulating layer 39 formed of an organic insulating material or the like.

As shown in FIG. 3, on the two side surfaces of the track width forming groove 31a in the track width direction (X direction in the figure), inclined surfaces 31c and 31c are formed so that the width therebetween is gradually increased from the upper surface of the upper magnetic pole layer 34 to an upper surface 31b of the insulating layer 31 in the direction away from the lower core layer 16.

In addition, as shown in FIG. 3, a front end portion 40a of the upper core layer 40 is formed over the upper surface of the upper magnetic pole layer 34 to the inclined surfaces 31c and 31c in the direction away from the lower core layer 16.

As shown in FIG. 4, the upper core layer 40 is formed on the insulating layer 39 from the face opposing a recording medium in the height direction (Y direction in the figure), and a base end portion 40b of the upper core layer 40 is directly formed on the lower core layer 16.

In the second embodiment shown in FIGS. 3 and 4, the lower core layer 16 and/or the upper core layer 40 is formed of a soft magnetic film composed of an alloy represented by the formula FeNiRe.

As a particular FeNiRe alloy, for example, $(Fe_xNi_y)_aRe_b$ may be mentioned, in which $0.54 \leq x \leq 0.74$ and $x+y=1$ are satisfied when x and y are on a mass percent ratio basis, and $0 < b \leq 10.1$ and $a+b=100$ are satisfied when a and b are on a mass percent basis.

The FeNiRe alloy described above has both a high saturated magnetic flux density Bs and a high resistivity. When the soft magnetic film described above is used as the lower core layer 16 and/or the upper core layer 40 of a thin film magnetic head, while the magnetic flux can be concentrated in the vicinity of the gap, the eddy current loss can be reduced in a high frequency region, and hence the trend toward higher recording density can be facilitated.

In the embodiments shown in FIGS. 1 to 4, the magnetic pole portion 18 is provided between the lower core layer 16 and the upper core layer 22, the magnetic pole portion 30 is provided between the lower core layer 16 and the upper core layer 40, the lower core layer 16 and/or the upper core layer 22 is formed of a soft magnetic film composed of the FeNiRe alloy described above, and the lower core layer 16 and/or the upper core layer 40 is formed of a soft magnetic film composed of the FeNiRe alloy described above. In addition, according to the present invention, the lower magnetic pole layer 19 and/or the upper magnetic pole layer 21 may be formed of a soft magnetic film composed of the FeNiRe alloy described above, and the lower magnetic pole layer 32 and/or the upper magnetic pole layer 34 may be formed of a soft magnetic film composed of the FeNiRe alloy described above.

In addition, the lower core layer 16 and the upper core layer 22 may be formed of a soft magnetic film which is composed of an alloy, such as a NiFe (permalloy) alloy, other than the FeNiRe alloy described above, and the lower magnetic pole layer 19 and/or the upper magnetic pole layer 21 may be formed of a soft magnetic film composed of the FeNiRe alloy described above. In addition, the lower core layer 16 and the upper core layer 40 may be formed of a soft magnetic film which is composed of an alloy, such as a NiFe (permalloy) alloy, other than the FeNiRe alloy described above, and the lower magnetic pole layer 32 and/or the upper magnetic pole layer 34 may be formed of a soft magnetic film composed of the FeNiRe alloy described above.

However, the lower magnetic pole layer 19 and/or the upper magnetic pole layer 21 preferably has a higher saturated magnetic flux density than that of the lower core layer 16 and the upper core layer 22, and the lower magnetic pole layer 32 and/or the upper magnetic pole layer 34 preferably has a higher saturated magnetic flux density than that of the lower core layer 16 and the upper core layer 40.

In addition, the lower magnetic pole layer 19 and/or the upper magnetic pole layer 21 may be formed of at least two magnetic layers placed one over the other, and the lower magnetic pole layer 32 and/or the upper magnetic pole layer 34 may be formed of at least two magnetic layers placed one over the other. In the case described above, it is preferable that a magnetic layer provided away from each of the gap layers 20 and 33 be formed of a soft magnetic film composed of the FeNiRe alloy, and a magnetic layer in contact with each of the gap layers 20 and 33 have a saturated magnetic flux density higher than that of the magnetic layer provided away therefrom. Accordingly, since the magnetic flux can be concentrated in the vicinity of the gap, and the loss in a high frequency region can be reduced, a thin film magnetic head can be manufactured which can meet the trend toward higher recording density.

In addition, the saturated magnetic flux densities Bs of the lower magnetic pole layers 19 and 32 are preferably high. However, when the saturated magnetic flux densities Bs of the lower magnetic pole layers 19 and 32 are decreased lower than those of the upper magnetic pole layers 21 and 34, respectively, magnetization inversion of a leakage magnetic field between the lower magnetic pole layer and the upper pole magnetic layer is likely to occur, and as a result, the recording density of signals on a recording medium can be further increased.

Figure 5:
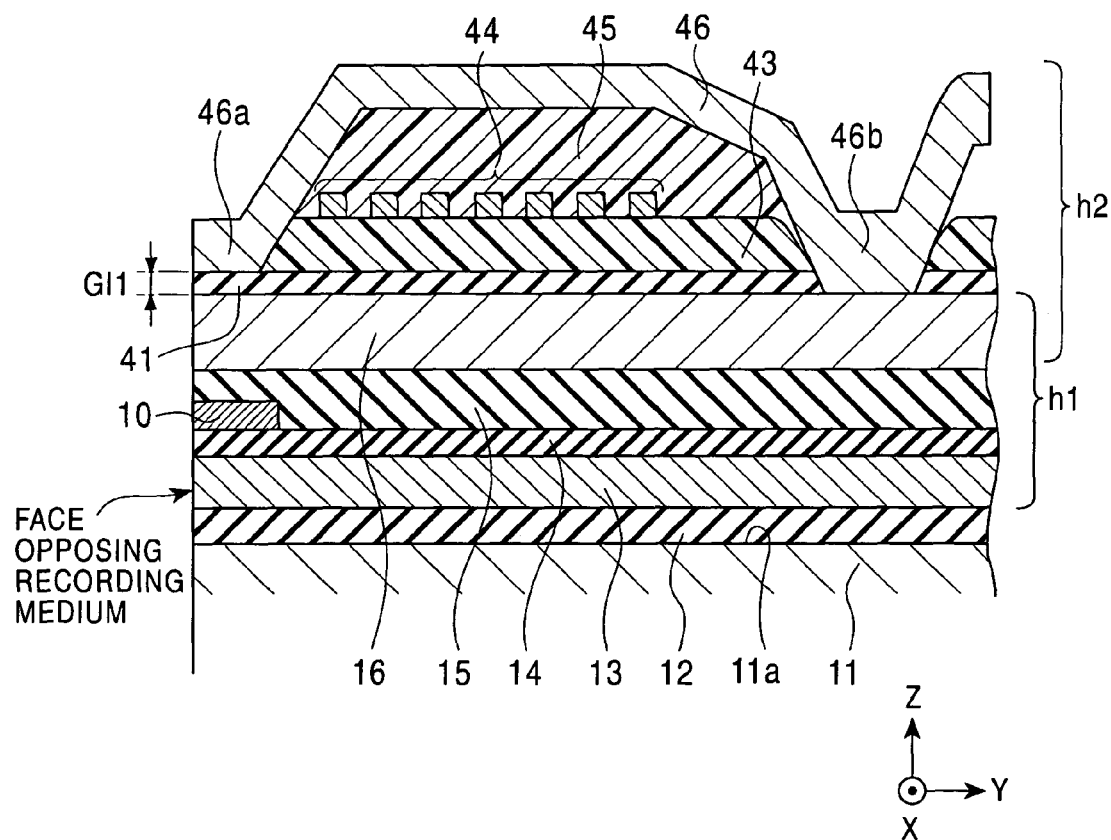
FIG. 5 is a vertical cross-sectional view of a thin film magnetic head according to a third embodiment of the present invention.

FIG. 5 is a vertical cross-sectional view of a thin film magnetic head of a third embodiment according to the present invention.

In this embodiment, the MR head h1 is the same as that shown in FIG. 1. As shown in FIG. 5, on the lower core layer 16, a magnetic gap layer (nonmagnetic material layer) 41 composed of alumina or the like is formed. In addition, above the magnetic gap layer 41, a coil layer 44 having a planar spiral pattern is formed with an insulating layer 43 of a polyimide resin or a resist material provided therebetween. The coil layer 44 described above is formed of a nonmagnetic conductive material, such as copper (Cu), having small electric resistance.

Furthermore, the coil layer 44 described above is covered with an insulating layer 45 formed of a polyimide resin or a resist material, and on this insulating layer 45, an upper core layer 46 composed of a soft magnetic material is formed.

As shown in FIG. 5, a front end portion 46a of the upper core layer 46 is disposed above the lower core layer 16 with the magnetic gap layer 41 provided therebetween at the face opposing a recording medium, thereby forming a magnetic gap having a magnetic gap length Gl1. In addition, as shown in FIG. 5, a base end portion 46b of the upper core layer 46 is magnetically coupled with the lower core layer 16.

In the present invention, the lower core layer 16 and/or the upper core layer 46 is formed of a soft magnetic film composed of an alloy represented by the formula FeNiRe.

As a particular FeNiRe alloy, for example, $(Fe_xNi_y)_aRe_b$ may be mentioned, in which $0.54 \leq x \leq 0.74$ and $x+y=1$ are satisfied when x and y are on a mass percent ratio basis, and $0<b \leq 10.1$ and $a+b=100$ are satisfied when a and b are on a mass percent basis.

The FeNiRe alloy described above has both a high saturated magnetic flux density Bs and a high resistivity. When the soft magnetic film described above is used as the lower core layer 16 and the upper core layer 46 of a thin film magnetic head, while the magnetic flux can be concentrated in the vicinity of the gap, the eddy current loss can be reduced in a high frequency region, and hence the trend toward higher recording density can be facilitated.

Figure 6:
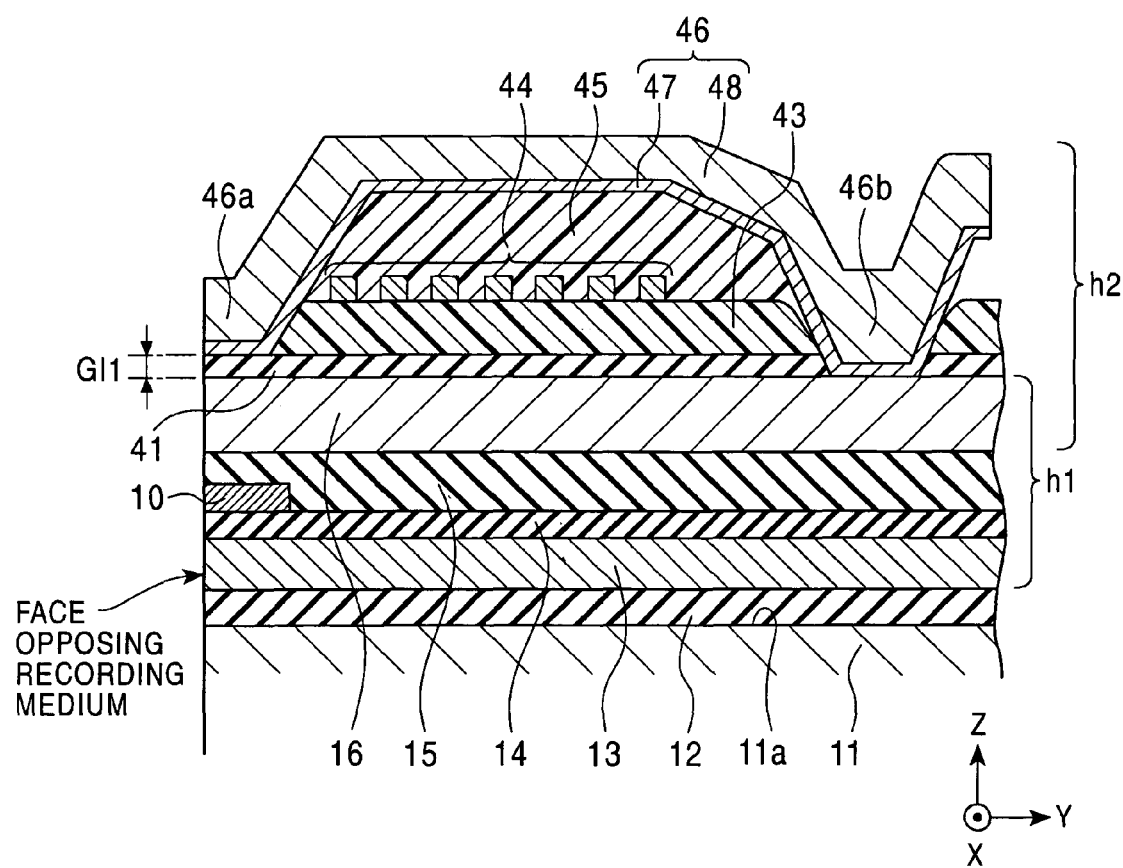
FIG. 6 is a vertical cross-sectional view of a thin film magnetic head according to a fourth embodiment of the present invention.

FIG. 6 is a vertical cross-sectional view of a thin film magnetic head of a fourth embodiment according to the present invention.

The point of the thin film magnetic head mentioned above different from that shown in FIG. 5 is the structure of the upper core layer 46 which is composed of two magnetic layers.

The upper core layer 46 is formed of a high Bs layer 47 having a high saturated magnetic flux density Bs and an upper layer 48 provided thereon.

The upper layer 48 is formed of a soft magnetic film composed of an alloy represented by the formula FeNiRe.

As a particular FeNiRe alloy, for example, $(Fe_xNi_y)_aRe_b$ may be mentioned, in which $0.54 \leq x \leq 0.74$ and $x+y=1$ are satisfied when x and y are on a mass percent ratio basis, and $0<b \leq 10.1$ and $a+b=100$ are satisfied when a and b are on a mass percent basis.

The upper layer 48 forming the upper core layer 46 described above has a higher resistivity than that of the high Bs layer 47. The high Bs layer 47 is formed, for example, of a NiFe alloy. In addition, when the high Bs layer 47 has a saturated magnetic flux density Bs higher than that of the upper layer 48, the magnetic flux can be concentrated in the vicinity of the gap, and as a result, the recording resolution can be improved.

Since the upper core layer 46 comprises the upper layer 48 formed of a soft magnetic film of the FeNiRe alloy having a high resistivity, the eddy current loss generated when the recording frequency is increased can be reduced, and as a result, a thin film magnetic head capable of fulfilling the trend toward higher recording frequency can be manufactured.

In the present invention, as shown in FIG. 6, the high Bs layer 47 is preferably formed at the lower side so as to face the gap layer 41. In addition, the high Bs layer 47 may be formed only at the front end portion 46a of the upper core layer 46 which is in direct contact with the gap layer 41.

The lower core layer 16 may also be formed of two layers, that is, a high Bs layer and a high resistivity layer. In this case, the high Bs layer is provided on the high resistivity layer so as to face the upper core layer 46 with the gap layer 41 provided therebetween.

In addition, in the embodiment shown in FIG. 6, the upper core layer 46 has a two-layered structure; however, the upper core layer 46 may be composed of at least three layers. In the structure described above, the high Bs layer 47 is preferably formed at the side which is in contact with the magnetic gap layer 41.

Figure 7:
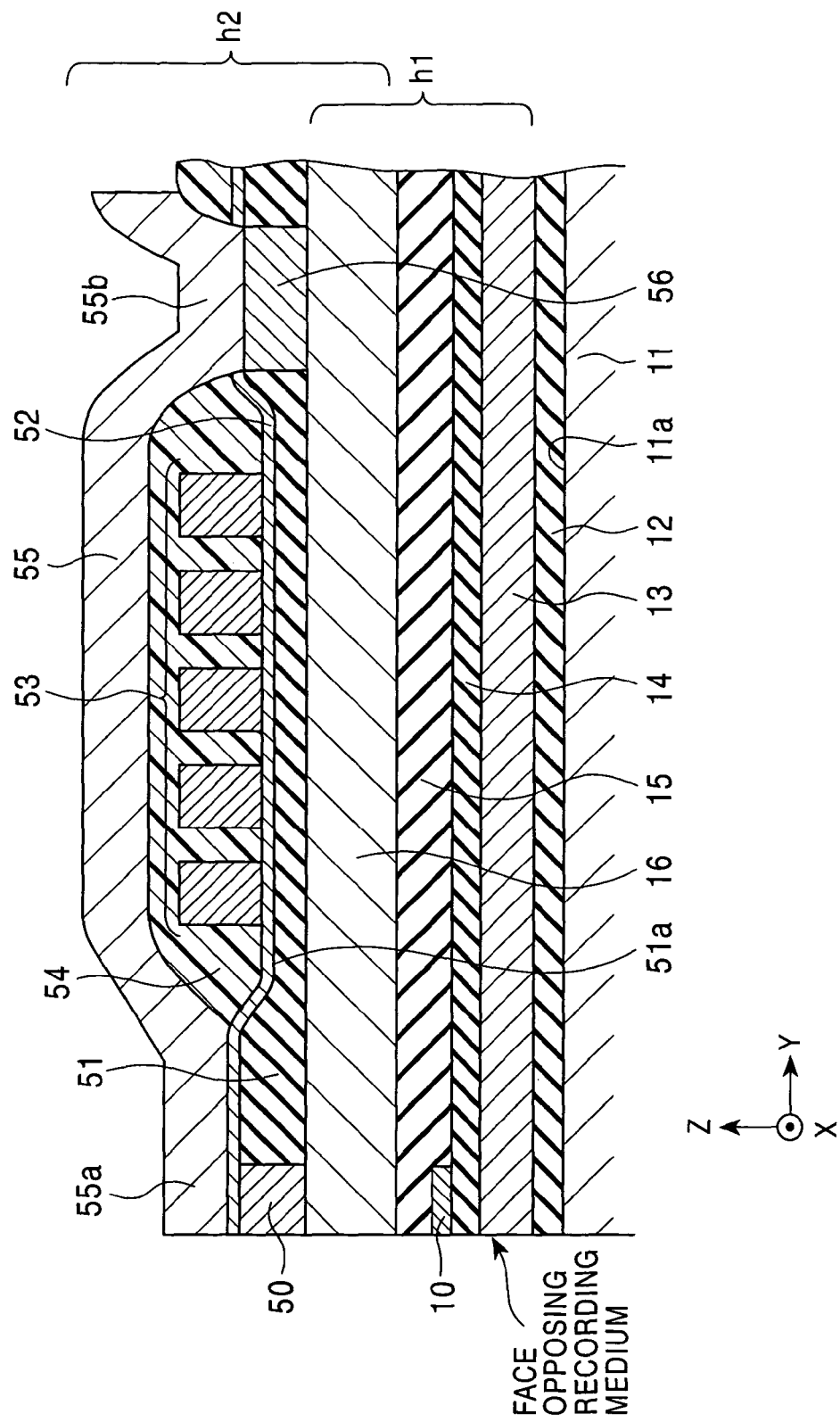
FIG. 7 is a vertical cross-sectional view of a thin film magnetic head according to a fifth embodiment of the present invention.

FIG. 7 is a vertical cross-sectional view of a thin film magnetic head of a fifth embodiment according to the present invention.

In the embodiment shown in FIG. 7, the structure of the MR head h1 is the same as that shown in FIG. 1. As shown in FIG. 7, a bulged lower magnetic pole layer 50 is formed on the lower core layer 16 from the face opposing a recording medium. An insulating layer 51 is formed at the rear side of the lower magnetic pole layer 50 in the height direction (Y direction in the figure). On the upper surface of the insulating layer 51, a coil forming surface 51a having a concave shape is formed.

A gap layer 52 is formed over the lower magnetic pole layer 50 to the insulating layer 51. In addition, above the coil forming surface 51a of the insulating layer 51, a coil layer 53 is formed with the gap layer 52 provided therebetween. The coil layer 53 is covered with an insulating layer 54 composed of an organic insulating material.

As shown in FIG. 7, an upper core layer 55 having a pattern is formed, for example, by frame plating over the gap layer 52 to the insulating layer 54.

A front end portion 55a of the upper core layer 55 is formed on the gap layer 52 so as to face the lower magnetic pole layer 50. A base end portion 55b of the upper core layer 55 is magnetically coupled with the lower core layer 16 with a lifting layer 56 provided therebetween, which is formed on the lower core layer 16.

In this embodiment, the upper core layer 55 and/or the lower core layer 16 is formed of a soft magnetic film of an alloy represented by the formula FeNiRe.

As a particular FeNiRe alloy, for example, $(Fe_xNi_y)_aRe_b$ may be mentioned, in which $0.54 \leq x \leq 0.74$ and $x+y=1$ are satisfied when x and y are on a mass percent ratio basis, and $0<b \leq 10.1$ and $a+b=100$ are satisfied when a and b are on a mass percent basis.

In FIG. 7, when the lower magnetic pole layer 50 is formed so as to have a saturated magnetic flux density Bs higher than that of the lower core layer 16, the magnetic flux can be concentrated in the vicinity of the gap, and as a result, the recording density can be improved.

In addition, the lower magnetic pole layer 50 may be formed of a soft magnetic film of an alloy represented by the FeNiRe.

In addition, the entire upper core layer 55 may be formed of the FeNiRe alloy described above; however, as is the case shown in FIG. 6, the upper core layer 55 may have a multilayer structure containing at least two magnetic layers, and one of the magnetic layers away from the gap layer 52 may be formed of the FeNiRe alloy described above. In this case, it is preferable that the front end portion 55a of the upper core layer 55 only have a multilayer structure having at least two magnetic layers, and that a high Bs layer be formed directly on the gap layer 52. Accordingly, the magnetic flux can be concentrated in the vicinity of the gap, and as a result, the recording density can be improved.

In addition, in the embodiments described above, the layer indicated by reference numeral 16 is a layer which is used as both the lower core layer and the upper shield layer; however, the lower core layer and the upper shield layer may be separately formed. In this case, an insulating layer is provided between the lower core layer and the upper shield layer.

Next, general manufacturing methods of the thin film magnetic heads shown in FIGS. 1 to 7 will be described.

As for the thin film magnetic head shown in FIGS. 1 and 2, after the Gd determining layer 17 is formed on the lower core layer 16, the magnetic pole portion 18 composed of the lower magnetic pole layer 19, the nonmagnetic gap layer 20, and the upper magnetic pole layer 21 is formed by sequential plating using a resist from the face opposing a recording medium in the height direction. Next, after the insulating layer 23 is formed at the rear side of the magnetic pole portion 18 in the height direction, the upper surface of the magnetic pole portion 18 and the upper surface of the insulating layer 23 are planarized, for example, by a CMP technique so as to be flush with each other. On the insulating layer 23, the coil layer 24 having a spiral pattern is formed, and the insulating layer 25 is then formed on the coil layer 24. Subsequently, the upper core layer 22 is formed, for example, by frame plating over the magnetic pole portion 18 to the insulating layer 25.

As for the thin film magnetic head shown in FIGS. 3 and 4, after the insulating layer 31 is formed on the lower core layer 16, the track width forming groove 31a is formed in the insulating layer 31 using a resist from the face opposing a recording medium to the rear side in the height direction. In addition, the inclined surfaces 31c and 31c shown in FIG. 3 are formed in the track width forming groove 31a.

In the track width forming groove 31a, the lower magnetic pole layer 32 and the nonmagnetic gap layer 33 are formed. After the Gd determining layer 37 is formed over the gap layer 33 to the insulating layer 31, the upper magnetic pole layer 34 is formed on the gap layer 33 by plating. Next, after the coil layer 38 having a spiral pattern is formed on the insulating layer 31, the insulating layer 39 is formed on the coil layer 38. Subsequently, the upper core layer 40 is formed, for example, by frame plating over the upper magnetic pole layer 34 to the insulating layer 39.

As for the thin film magnetic heads shown in FIGS. 5 and 6, after the gap layer 41 is first formed on the lower core layer 16, the insulating layer 43 is further formed, and the coil layer 44 having a pattern is formed on the insulating layer 43. After the insulating layer 45 is formed on the coil layer 44, the upper core layer 46 having a pattern is formed by frame plating over the gap layer 41 to the insulating layer 45.

As for the thin film magnetic head shown in FIG. 7, the lower magnetic pole layer 50 is first formed on the lower core layer 16 using a resist, and the insulating layer 51 is further formed at the rear side of the lower magnetic pole layer 50 in the height direction. After the upper surface of the lower magnetic pole layer 50 and the upper surface of the insulating layer 51 are planarized by a CMP technique, the coil forming surface 51a having a concave shape is formed on the upper surface of the insulating layer 51. Next, after the gap layer 52 is formed over the lower magnetic pole layer 50 to the insulating layer 51, the coil layer 53 having a spiral pattern is formed on the gap layer 52, and the insulating layer 54 is further formed on the coil layer 53. Subsequently, the upper core layer 55 is formed, for example, by frame plating over the gap layer 52 to the insulating layer 54.

In the present invention, the soft magnetic film composed of the FeNiRe alloy, which forms the lower core layer 16, the upper core layer 22, 40, 46, and 55, the lower magnetic pole layer 19, 32, and 50, and the upper magnetic pole layer 21 and 34, is formed by plating using a direct current or a pulse current.

Since the soft magnetic film composed of the FeNiRe alloy is formed by plating, an optional thickness can be obtained, and a film can be formed having a larger thickness than that obtained by sputtering.

Furthermore, by using frame plating, a soft magnetic film having an optional shape can be obtained.

In the pulse current plating, for example, by repeating ON and OFF of a current control device, a current is allowed to flow intermittently. Since no current flows for a predetermined period of time at regular intervals as described above, the FeNiRe alloy film is slowly formed by plating, and even when the concentration of Fe ions in a plating bath is increased, the deviation of current density distribution can be reduced as compared to that obtained by a related plating technique using a direct current.

The pulse current is obtained, for example, by repeating ON and OFF at several-second intervals, and the duty ratio is preferably set to approximately 0.1 to 0.5. The conditions of the pulse current have influences on the average crystal grain diameter of the FeNiRe alloy and the center line average roughness Ra of the film surface.

As described above, since the pulse current plating can reduce the deviation of current density distribution in plating, the Fe content in the FeNiRe alloy can be increased as compared to that obtained by direct current plating.

However, when an FeNiRe alloy containing a small amount of Fe is formed, direct current plating may be used. In particular, when a soft magnetic film is represented by the formula $(Fe_xNi_y)_aRe_b$, in which $0.54 \leq x \leq 0.62$ and $x+y=1$ are satisfied when x and y are on a mass percent ratio basis, and $0 < b \leq 10.1$ and $a+b=100$ are satisfied when a and b are on a mass percent basis, direct current plating may be used.

Figure 8:
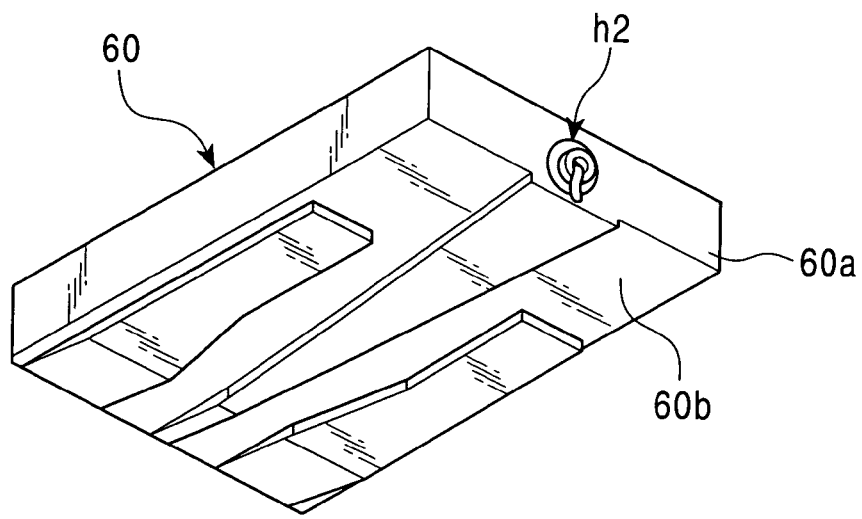
FIG. 8 is a view of the entire slider provided with a thin film magnetic head of the present invention.

FIG. 8 is a view showing the entire slider provided with the thin film magnetic head of the present invention. A slider 60, which is composed of $Al_2O_3$—TiC in the form of an approximately rectangular parallelepiped, is provided for a magnetic recording device such as a hard magnetic disc, and a face 60b opposes a recording medium. On an end surface 60a of the slider 60 at a trailing side, a thin film magnetic head h2 is formed.

The slider 60 provided with the thin film magnetic head h2 is placed so that the face 60b opposes a recording medium (not shown in the figure) such as a hard disc of a magnetic recording device, and the recording medium is rotated. In this step, an air flow along the surface of the recording medium enables the slider 60 to float slightly therefrom, and the floating position of the slider 60 is determined so that the distance between the thin film magnetic head h2 provided on the end surface of the slider 60 and the surface of the recording medium is within a predetermined value.

When a recording current is applied to a coil layer 12 of the thin film magnetic head h2, a recording magnetic field is induced into an upper core layer 6 and a lower core layer 1. This recording magnetic field forms a leakage magnetic field between an upper magnetic pole layer 5 and a lower magnetic pole layer 3 with a gap layer 4 provided therebetween, and this leakage magnetic field is applied to the recording medium.

In recent years, the recording density of a recording medium has been improved, and concomitant with this improvement, it has been required that a large magnetic field is concentrated in a limited small area of a recording medium so as to write recording signals. Hence, the distance between the surface of the recording medium and the inductive head h2 provided on the end surface of the slider 60 is required to be decreased.

However, when the distance between the surface of the recording medium and the inductive head h2 provided on the end surface of the slider 60 is decreased, the inductive head h2 is likely to be brought into contact with the surface of the recording medium, a lubricant coated on the surface thereof may adhere to the thin film magnetic head, and as a result, the inductive head h2 becomes liable to corrode.

In the present invention, since the lower core layer 16, the upper core layers 22, 40, 46, and 55, the lower magnetic pole layers 19, 32, and 50, and the upper magnetic pole layers 21 and 34 are formed of a soft magnetic film composed of the FeNiRe alloy described above, and the FeNiRe alloy is a material having superior corrosion resistance, even when the lubricant described above adheres to the thin film magnetic head, the corrosion of the lower core layer 16, the upper core layers 22, 40, 46, and 55, the lower magnetic pole layers 19, 32, and 50, and the upper magnetic pole layers 21 and 34 can be suppressed. Hence, the reliability of the inductive head h2 can be improved when the distance between the surface of the recording medium and the inductive head h2 is decreased so as to meet the trend toward higher recording density.

In the present invention, as applications of the soft magnetic film composed of the FeNiRe alloy described above, the thin film magnetic heads shown in FIGS. 1 to 7 are described; however, the applications thereof are not limited thereto. For example, the soft magnetic film composed of the FeNiRe alloy may be applied to planar magnetic elements such as a thin film inductor.

EXAMPLE

By electroplating, a NiFe alloy (comparative example) and FeNiRe alloys (example) were formed.

A plating bath composition of the NiFe alloy is shown in Table 1, and plating bath compositions of the FeNiRe alloys are shown in Table 2.

TABLE 1

| NiFe | |
|---|---|
| Fe Ion Concentration (g/l) | 1.0 to 3.0 |
| Ni Ion Concentration (g/l) | 10 |
| Fe Ion/Ni Ion | 0.10 to 0.30 |
| Boric Acid Concentration (g/l) | 25 |
| NaCl Concentration (g/l) | 25 |
| Saccharin Sodium Concentration (g/l) | 2.0 |
| Pulse Current Density (mA/cm$^2$) | 19 |
| Duty Ratio of Pulse Current | 0.3 |

TABLE 2

| NiFeRe | | | | |
|---|---|---|---|---|
| Re Mass % of Film | 1 to 3 | 3 to 5 | 5 to 7 | 10 |
| Fe Ion Concentration (g/l) | 1.2 to 2.9 | 1.3 to 2.9 | 1.5 to 2.9 | 2.5 |
| Ni Ion Concentration (g/l) | 10 | 10 | 10 | 10 |
| Fe Ion/Ni Ion | 0.12 to 0.29 | 0.13 to 0.29 | 0.15 to 0.29 | 0.25 |
| Re Ion Concentration (g/l) | 0.01 to 0.04 | 0.02 to 0.04 | 0.03 to 0.04 | 0.04 |
| Boric Acid Concentration (g/l) | 25 | 25 | 25 | 25 |
| NaCl Concentration (g/l) | 25 | 25 | 25 | 25 |
| Saccharin Sodium Concentration (g/l) | 2.0 | 2.0 | 2.0 | 2.0 |
| Pulse Current Density (mA/cm$^2$) | 19 to 23 | 13 to 19 | 10 to 13 | 8 |
| Duty Ratio of Pulse Current | 0.3 | 0.3 | 0.3 | 0.3 |

In this experiment, the plating bath temperature was set to 25 to 30° C. In addition, the pH of the plating bath was set to 3.0 to 4.0. A Ni electrode was used as the anode. In this experiment, pulse current plating was performed. Furthermore, the duty ratio (ON/OFF) of a pulse current was set to 0.3 (300/700 msec/msec).

In this example, the FeNiRe alloy is formed by pulse current plating. The pulse current plating is performed, for example, by repeating ON and OFF of a current control device so as to allow current to flow intermittently. As described above, since no current flows for a predetermined period of time at regular intervals, the FeNiRe alloy film is slowly formed by plating, and the deviation of current density distribution, which occurs in a related plating technique using a direct current, can be reduced. According to the pulse current plating, compared to direct current plating, the Fe content of the soft magnetic film can be easily controlled, and a large amount of Fe can be incorporated thereinto.

The concentration of Ni ions contained in a plating bath used for the manufacturing method of the soft magnetic film of the present invention is low, such as 10 g/l. Accordingly, the concentration of Ni ions in the plating bath brought into contact with the surface of a cathode (which is to be plated) is relatively decreased in plating, and as a result, due to improvement of a stirring effect, a large amount of Fe can be incorporated into the film. In addition, when the stirring effect is improved, Fe ions are appropriately supplied, and hence a dense crystal can be formed.

As is the example of the present invention, when saccharin sodium ($C_6H_4CONNaSO_2$) is added to the plating bath for the FeNiRe alloy, since the saccharin sodium serves as a stress-relaxing agent, a film stress of the FeNiRe alloy formed by plating can be reduced.

In addition, when 2-butyne-1,4-diol is added to the plating solution for the FeNiRe alloy, growth of large and coarse crystal grains of the FeNiRe alloy can be suppressed, and the coercive force Hc can be decreased.

In addition, when 2-ethylhexyl sodium sulfate, which is a surfactant, is added to the plating bath for the FeNiRe alloy, hydrogen generated when the FeNiRe alloy is formed by plating can be removed, and hence the hydrogen is prevented from adhering to the plating film. When hydrogen adheres to the plating film, a dense crystal cannot be formed, and as a result, the film surface is seriously roughened. Accordingly, when the hydrogen is removed as in the case of the present invention, the surface roughness of the plating film can be decreased, and the coercive force Hc can be decreased.

Instead of the 2-ethylhexyl sodium sulfate described above, sodium lauryl sulfate may be used; however, the sodium lauryl sulfate is likely to generate bubbles when being added to the plating bath as compared to the 2-ethylhexyl sodium sulfate, and hence the sodium lauryl sulfate is difficult to use so as to effectively remove hydrogen. Accordingly, in the present invention, 2-ethylhexyl sodium sulfate, which is unlikely to generate bubbles as compared to the sodium lauryl sulfate described above, is preferably used since hydrogen can be effectively removed.

In addition, when boric acid is added to the plating bath, it serves as a pH buffer at the surface of an electrode and also effectively gives gloss to a plating film.

Next, the relationship of the composition ratio x of Fe and the composition b (mass percent) of Re of a soft magnetic film with the resistivity ρ and the saturated magnetic flux density Bs will be described. The soft magnetic film described above is represented by the formula $(Fe_xNi_y)_a Re_b$ in which x+y=1 is satisfied when x and y are on a mass percent ratio basis and a+b=100 is satisfied when a and b are on a mass percent basis.

Figure 9:
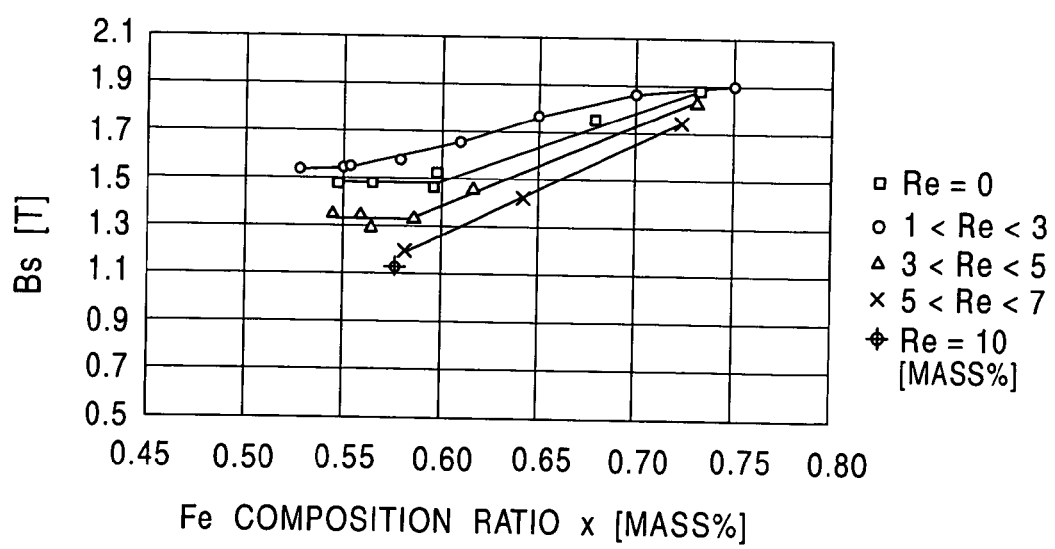
FIG. 9 is a graph showing the relationship of the saturated magnetic flux density Bs with the composition ratio x of Fe and the composition b (mass percent) of Re of a soft magnetic film represented by the formula $(Fe_xNi_y)_aRe_b$, in which $x+y=1$ is satisfied when x and y are on a mass percent ratio basis, and $a+b=100$ is satisfied when a and b are on a mass percent basis.
Figure 10:
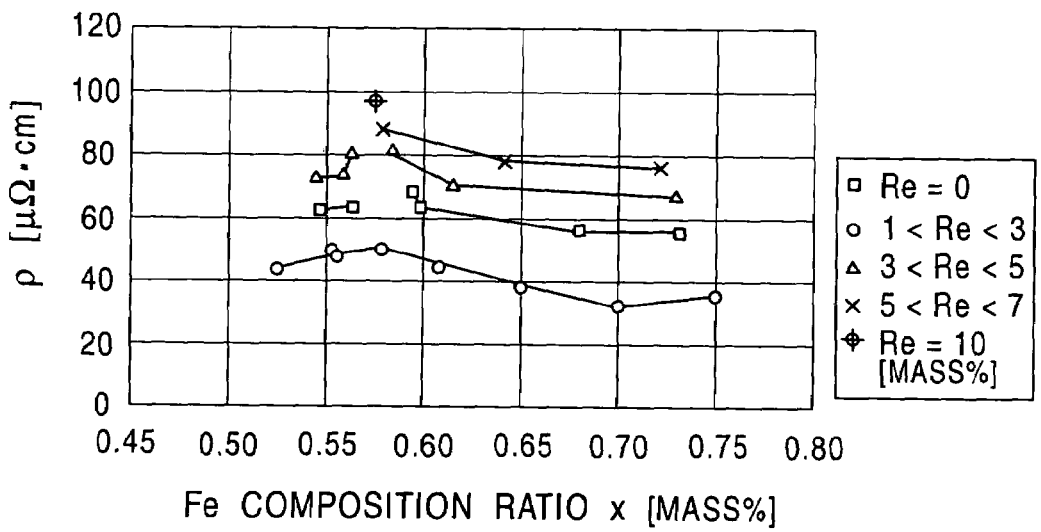
FIG. 10 is a graph showing the relationship of the resistivity ρ with the composition ratio x of Fe and the composition b (mass percent) of Re of a soft magnetic film represented by the formula $(Fe_xNi_y)_aRe_b$, in which $x+y=1$ is satisfied when x and y are on a mass percent ratio basis, and a+b=100 is satisfied when a and b are on a mass percent basis.

FIGS. 9 and 10 are graphs each showing the relationship of the composition ratio x of Fe and the composition b (mass percent) of Re of a soft magnetic film, which is represented by the formula $(Fe_xNi_y)_a Re_b$, with the resistivity ρ and the saturated magnetic flux density Bs. In the soft magnetic film described above, x+y=1 is satisfied when x and y are on a mass percent ratio basis, and a+b=100 is satisfied when a and b are on a mass percent basis.

According to the graph shown in FIG. 9, when the composition ratio x of Fe to Ni of a $Ni_xFe_y$ alloy, which does not contain Re, is increased, the saturated magnetic flux density Bs is increased (shown by o). According to the present invention, even when the composition ratio x of Fe to Ni is 0.65 or more, the saturated magnetic flux density is continuously increased. This tendency is opposite to that of the soft magnetic film of the related technique disclosed in Japanese Unexamined Patent Application Publication No. 8-212512.

In addition, when the composition ratio x of Fe to Ni of the $(Fe_xNi_y)_aRe_b$ alloy, which contains Re, is increased, the saturated magnetic flux density Bs is increased. As described above, in the example of the present invention, the concentration of Ni ions in the plating bath is set to 10 g/l, the ratio of the concentration of Fe ions to that of Ni ions is set in the range of from 0.12 to 0.29, and pulse current plating is used. Accordingly, although the composition ratio x of Fe to Ni is 0.65 or more, a magnetic film having a high saturated magnetic flux density can be formed by plating with high reproducibility.

According to the graph shown in FIG. 9, when the Re content b (mass percent) is in the range of from more than 1 to less than 3 (mass percent) (shown by □), the saturated magnetic flux density Bs of the $(Fe_xNi_y)_aRe_b$ alloy is increased approximately linearly as the Fe is increased when the composition ratio x of Fe to Ni of the $(Fe_xNi_y)_aRe_b$ alloy satisfies $0.596 \leq x \leq 0.735$. In addition, when the composition ratio x of Fe to Ni is 0.596, the saturated magnetic flux density Bs is 1.48 (T), and when the composition ratio x of Fe to Ni is 0.735, the saturated magnetic flux density Bs is 1.88 (T).

When the Re content b (mass percent) is in the range of from more than 3 to less than 5 (mass percent) (shown by Δ), the saturated magnetic flux density Bs of the $(Fe_xNi_y)_aRe_b$ alloy is increased linearly as the Fe is increased when the composition ratio x of Fe to Ni of the $(Fe_xNi_y)_aRe_b$ alloy satisfies $0.585 \leq x \leq 0.733$. In addition, when the composition ratio x of Fe to Ni satisfies $0.543 \leq x \leq 0.585$, the saturated magnetic flux density Bs of the $(Fe_xNi_y)_aRe_b$ alloy is not changed even when the Fe is increased. When the composition ratio x of Fe to Ni is 0.543, the saturated magnetic flux density Bs is 1.33 (T); when the composition ratio x is 0.585, the saturated magnetic flux density Bs is also 1.33 (T); and when the composition ratio x is 0.733, the saturated magnetic flux density Bs is 1.83 (T).

When the Re content b (mass percent) is in the range of from more than 5 to less than 7 (mass percent) (shown by x), the saturated magnetic flux density Bs of the $(Fe_xNi_y)_aRe_b$ alloy is increased linearly as the Fe is increased when the composition ratio x of Fe to Ni of the $(Fe_xNi_y)_aRe_b$ alloy satisfies $0.580 \leq x \leq 0.722$. When the composition ratio x of Fe to Ni is 0.580, the saturated magnetic flux density Bs is 1.20 (T), and when the composition ratio x is 0.722, the saturated magnetic flux density Bs is 1.73 (T).

According to the graph shown in FIG. 9, it is understood that when Re is added to NiFe, the saturated magnetic flux density Bs is decreased. When the composition ratio x of Fe to Ni of the $(Fe_xNi_y)_aRe_b$ alloy is not changed, the saturated magnetic flux density Bs is decreased as the Re content b (mass percent) is increased. In addition, in the case in which the Re content b (mass percent) is increased, the rate of decrease in saturated magnetic flux density Bs is small when the composition ratio x of Fe to Ni of the $(Fe_xNi_y)_aRe_b$ alloy is large as compared to the case in which the composition ratio x is small.

In the case in which the composition ratio x of Fe to Ni of the $(Fe_xNi_y)_aRe_b$ alloy is 0.650, when the Re content b (mass percent) satisfies 1<b<3 mass percent, the saturated magnetic flux density Bs is 1.65 (T); when the Re content b (mass percent) satisfies 3<b<5 mass percent, the saturated magnetic flux density Bs is 1.56 (T); and when the Re content b (mass percent) satisfies 5<b<7 mass percent, the saturated magnetic flux density Bs is 1.46 (T).

In the case in which the composition ratio x of Fe to Ni of the $(Fe_xNi_y)_aRe_b$ alloy is 0.70, when the Re content b (mass percent) satisfies 1<b<3 mass percent, the saturated magnetic flux density Bs is 1.79 (T); when the Re content b (mass percent) satisfies 3<b<5 mass percent, the saturated magnetic flux density Bs is 1.73 (T); and when the Re content b (mass percent) satisfies 5<b<7 mass percent, the saturated magnetic flux density Bs is 1.65 (T).

Next, according to the graph shown in FIG. 10, in a $Ni_xFe_y$ alloy which does not contain Re, when the Fe content is 58 mass percent, the resistivity becomes maximum, and in both cases in which the Fe content is more than and less than 58 mass percent, the resistivity is decreased.

The resistivity ρ of the $(Fe_xNi_y)_aRe_b$ alloy, which contains Re, is always larger than that of the $Ni_xFe_y$ alloy which does not contain Re. In addition, the resistivity ρ of the $(Fe_xNi_y)_aRe_b$ alloy, which contains Re, has a maximum value when the composition ratio x of Fe to Ni is approximately 0.580.

According to the graph shown in FIG. 10, in the case in which the Re content b (mass percent) is in the range of from more than 1 to less than 3 (mass percent) (shown by □), when the composition ratio x of Fe to Ni of the $(Fe_xNi_y)_aRe_b$ alloy is 0.596, the $(Fe_xNi_y)_aRe_b$ alloy has a maximum resistivity ρ of 69 μΩ·cm. When the composition ratio x of Fe to Ni of the $(Fe_xNi_y)_aRe_b$ alloy satisfies $0.596 \leq x \leq 0.735$, the resistivity ρ is decreased as the Fe is increased. When the composition ratio x of Fe to Ni is 0.598, the resistivity ρ is 63 μΩ·cm; when the composition ratio x is 0.678, the resistivity ρ is 56 Ω·cm; and when the composition ratio x is 0.735, the resistivity ρ is 55 μΩ·cm.

In the case in which the Re content b (mass percent) is in the range of from more than 3 to less than 5 (mass percent) (shown by Δ), when the composition ratio x of Fe to Ni of the $(Fe_xNi_y)_aRe_b$ alloy is 0.585, the $(Fe_xNi_y)_aRe_b$ alloy has a maximum resistivity ρ of 81 μΩ·cm. When the composition ratio x of Fe to Ni of the $(Fe_xNi_y)_aRe_b$ alloy satisfies $0.585 \leq x \leq 0.733$, the resistivity ρ of the $(Fe_xNi_y)_aRe_b$ alloy is decreased as the Fe is increased, and when the composition ratio x satisfies $0.543 \leq x \leq 0.559$, the resistivity ρ of the $(Fe_xNi_y)_aRe_b$ alloy is decreased as the Fe is decreased. When the composition ratio x of Fe to Ni is 0.543, the resistivity ρ is 73 μΩ·cm; when the composition ratio x is 0.613, the resistivity ρ is 70 μΩ·cm; and when the composition ratio x is 0.733, the resistivity ρ is 67 μΩ·cm.

In the case in which the Re content b (mass percent) is in the range of from more than 5 to less than 7 (mass percent) (shown by x), when the composition ratio x of Fe to Ni of the $(Fe_xNi_y)_aRe_b$ alloy is 0.580, the $(Fe_xNi_y)_aRe_b$ alloy has a maximum resistivity ρ of 90 μΩ·cm. When the composition ratio x of Fe to Ni of the $(Fe_xNi_y)_aRe_b$ alloy satisfies $0.580 \leq x \leq 0.722$, the resistivity ρ of the $(Fe_xNi_y)_aRe_b$ alloy is decreased as the Fe is increased. When the composition ratio x of Fe to Ni is 0.641, the resistivity ρ is 79 μΩ·cm, and when the composition ratio x is 0.722, the resistivity ρ is 76 μΩ·cm.

In the case in which the composition ratio x of Fe to Ni of the $(Fe_xNi_y)_aRe_b$ alloy is 0.650, the resistivity ρ is 59 μΩ·cm when the Re content b (mass percent) is in the range of from more than 1 to less than 3 (mass percent), the resistivity ρ is 70 μΩ·cm when the Re content b (mass percent) is in the range of from more than 3 to less than 5 (mass percent), and the resistivity ρ is 78 μΩ·cm when the Re content b (mass percent) is in the range of from more than 5 to less than 7 (mass percent).

In the case in which the composition ratio x of Fe to Ni of the $(Fe_xNi_y)_aRe_b$ alloy is 0.70, the resistivity ρ is 55 μΩ·cm when the Re content b (mass percent) is in the range of from more than 1 to less than 3 (mass percent), the resistivity ρ is 68 μΩ·cm when the Re content b (mass percent) is in the range of from more than 3 to less than 5 (mass percent), and the resistivity ρ is 76 μΩ·cm when the Re content b (mass percent) is in the range of from more than 5 to less than 7 (mass percent).

The results in FIGS. 9 and 10 show the following.

When the Re content of the $(Fe_xNi_y)_aRe_b$ alloy is increased, the resistivity ρ is increased, and, concomitant therewith, the saturated magnetic flux density Bs is decreased.

When the composition ratio x of Fe to Ni of the $(Fe_xNi_y)_aRe_b$ alloy is increased, the decrease in saturated magnetic flux density Bs of an alloy containing Re becomes small, and hence the saturated magnetic flux density Bs becomes large; however, the resistivity ρ of the $(Fe_xNi_y)_aRe_b$ alloy is decreased lower than the maximum value thereof.

In addition, when the composition ratio x of Fe to Ni of the $(Fe_xNi_y)_aRe_b$ alloy is approximately 0.580, the resistivity ρ thereof becomes maximum, and on the other hand, the saturated magnetic flux density Bs is decreased.

Accordingly, the Re contents b of $(Fe_xNi_y)_aRe_b$ alloys having composition ratios x of 0.560 and 0.730, that is, $(Fe_{0.560}Ni_{0.440})_aRe_b$ and $(Fe_{0.730}Ni_{0.270})_aRe_b$, respectively, were changed, and the saturated magnetic flux density Bs and the resistivity ρ were measured.

Figure 11:
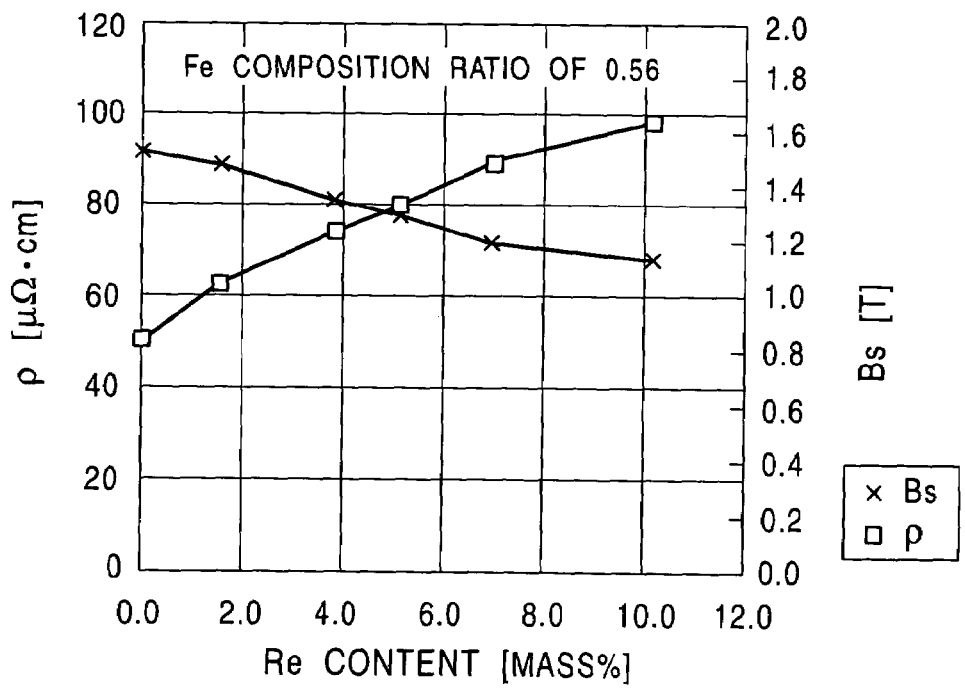
FIG. 11 is a graph showing the resistivity ρ and the saturated magnetic flux density Bs, which are obtained by changing the Re content b from zero to 10.1 (mass percent) while the composition ratio x of Fe to Ni of an $(Fe_xNi_y)_aRe_b$ alloy is set to 0.560.

FIG. 11 is a graph showing the resistivity ρ and the saturated magnetic flux density Bs, which are obtained by changing the Re content b from zero to 10.1 (mass percent) while the composition ratio x of Fe to Ni of the $(Fe_xNi_y)_aRe_b$ alloy is set to 0.560.

The plating bath composition is as follows.

TABLE 3

| NiFeRe | |
|---|---|
| Fe mass % ratio of Film | 0.56 |
| Fe Ion Concentration (g/l) | 1.2 to 2.5 |
| Ni Ion Concentration (g/l) | 10 |
| Fe Ion/Ni Ion | 0.12 to 0.25 |
| Re Ion Concentration (g/l) | 0.01 to 0.04 |
| Boric Acid Concentration (g/l) | 25 |
| NaCl Concentration (g/l) | 25 |
| Saccharin Sodium Concentration (g/l) | 2.0 |
| Pulse Current Density (mA/cm$^2$) | 8 to 19 |
| Duty Ratio of Pulse Current | 0.3 |

In the experiment, the plating bath temperature was set to 25 to 30° C. In addition, the pH of the plating bath was set to 3.0 to 4.0. A Ni electrode was used as the anode. The plating method of the example was pulse current plating. In addition, the duty ratio (ON/OFF) of a pulse current was set to 0.3 (300/700 msec/msec).

From the graph shown in FIG. 11, when the Re content of the $(Fe_{0.560}Ni_{0.440})_aRe_b$ alloy is increased, the saturated magnetic flux density Bs of the $(Fe_{0.560}Ni_{0.440})_aRe_b$ alloy is monotonously decreased, and the resistivity ρ thereof is monotonously increased.

According to the graph shown in FIG. 11, a $Ni_{44}Fe_{56}$ alloy, which does not contain Re, has a saturated magnetic flux density Bs of 1.55 (T), and when Re is continuously added, the saturated magnetic flux density Bs is linearly decreased when the Re content b satisfies $0<b \leq 7.0$ mass percent. When the Re content b is 7.0 mass percent, that is, the $(Fe_{0.560}Ni_{0.440})_{93.0}Re_{7.0}$ alloy has a saturated magnetic flux density Bs of 1.20 (T). When the Re content b is more than 7.0 mass percent, the slope of the curve of the saturated magnetic flux density Bs is decreased. When the Re content b is 10.1 mass percent, that is, the $(Fe_{0.560}Ni_{0.440})_{89.9}Re_{10.1}$ alloy has a saturated magnetic flux density Bs of 1.14 (T).

According to the graph shown in FIG. 11, the $Ni_{44}Fe_{56}$ alloy, which does not contain Re, has a resistivity ρ of 50 μΩ·cm. When the Re content b is 1.6 mass percent, that is, the $(Fe_{0.560}Ni_{0.440})_{98.4}Re_{1.6}$ alloy has a resistivity ρ of 63 μΩ·cm. When the Re content b satisfies $1.6 \leq b \leq 7.0$ mass percent, the resistivity ρ is linearly increased, and when the Re content b is 7.0 mass percent, that is, the $(Fe_{0.560}Ni_{0.440})_{93.0}Re_{7.0}$ alloy has a resistivity ρ of 90 μΩ·cm.

When the Re content b is more than 7.0 mass percent, the slope of the curve of the resistivity is decreased. When the Re content b is 10.1 mass percent, that is, the $(Fe_{0.560}Ni_{0.440})_{89.9}Re_{10.1}$ alloy has a resistivity ρ of 98 μΩ·cm.

Figure 12:
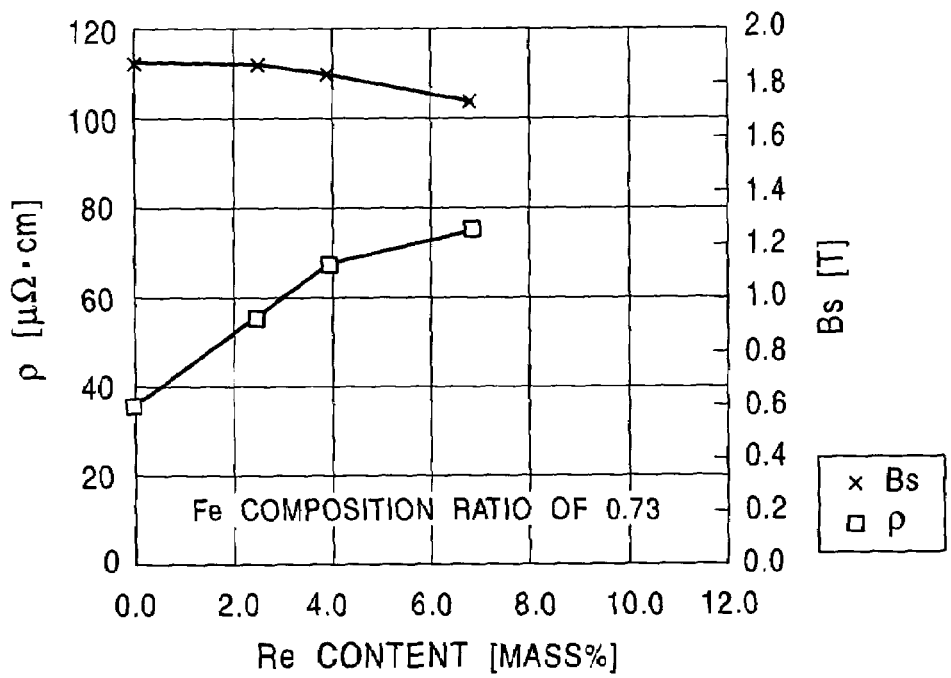
FIG. 12 is a graph showing the resistivity ρ and the saturated magnetic flux density Bs, which are obtained by changing the Re content b from zero to 6.9 (mass percent) while the composition ratio x of Fe to Ni of an $(Fe_xNi_y)_aRe_b$ alloy is set to 0.730.

FIG. 12 is a graph showing the resistivity ρ and the saturated magnetic flux density Bs, which are obtained by changing the Re content b from zero to 6.9 (mass percent) while the composition ratio x of Fe to Ni of the $(Fe_xNi_y)_aRe_b$ alloy is set to 0.730.

The plating bath composition is as follows.

TABLE 4

| NiFeRe | |
|---|---|
| Fe mass % ratio of Film | 0.73 |
| Fe Ion Concentration (g/l) | 2.9 |
| Ni Ion Concentration (g/l) | 10 |
| Fe Ion/Ni Ion | 0.29 |
| Re Ion Concentration (g/l) | 0.04 |
| Boric Acid Concentration (g/l) | 25 |
| NaCl Concentration (g/l) | 25 |
| Saccharin Sodium Concentration (g/l) | 2.0 |
| Pulse Current Density (mA/cm$^2$) | 13 to 19 |
| Duty Ratio of Pulse Current | 0.3 |

In the experiment, the plating bath temperature was set to 25 to 30° C. In addition, the pH of the plating bath was set to 3.0 to 4.0. A Ni electrode was used as the anode. The plating method of the example was pulse current plating. Furthermore, the duty ratio (ON/OFF) of a pulse current was set to 0.3 (300/700 msec/msec).

From the graph shown in FIG. 12, when the Re content of the $(Fe_{0.730}Ni_{0.270})_aRe_b$ alloy is increased, the saturated magnetic flux density Bs of the $(Fe_{0.730}Ni_{0.270})_aRe_b$ alloy is monotonously decreased, and the resistivity ρ thereof is monotonously increased.

According to the graph shown in FIG. 12, a $Ni_{27}Fe_{73}$ alloy, which does not contain Re, has a saturated magnetic flux density Bs of 1.89 (T), and when the Re content b is 2.4 mass percent, that is, the $(Fe_{0.730}Ni_{0.270})_{97.6}Re_{2.4}$ alloy has a saturated magnetic flux density Bs of 1.88 (T). In addition, when the Re content b satisfies $2.4 \leq b \leq 6.9$ mass percent, the saturated magnetic flux density Bs is linearly decreased.

When the Re content b is 6.9 mass percent, that is, the $(Fe_{0.730}Ni_{0.270})_{93.1}Re_{6.9}$ alloy has a saturated magnetic flux density Bs of 1.75 (T).

According to the graph shown in FIG. 12, the $Ni_{27}Fe_{73}$ alloy, which does not contain Re, has a resistivity ρ of 34 μΩ·cm. When the Re content b satisfies 0<b≦3.9 mass percent, the resistivity ρ is lineally increased, and when the Re content b is 3.9 mass percent, that is, the $(Fe_{0.730}Ni_{0.270})_{96.1}Re_{3.9}$ alloy has a resistivity ρ of 67.2 μΩ·cm. When the Re content b is more than 3.9 mass percent, the slope of the curve of the resistivity is decreased. When the Re content b is 6.9 mass percent, that is, the $(Fe_{0.730}Ni_{0.270})_{93.1}Re_{6.9}$ alloy has a resistivity ρ of 76 μΩ·cm.

From the results shown in FIGS. 11 and 12, it is understood that an $(Fe_xNi_y)_aRe_b$ alloy having a high resistivity ρ can be obtained when the composition ratio x of Fe to Ni is set to approximately in the range of from 0.560 to 0.580, and in addition, the Re content b is further increased.

For example, when the composition ratio x of Fe to Ni of the $(Fe_xNi_y)_aRe_b$ is set to 0.560, and the Re content b is changed from zero to 10.1 mass percent, a soft magnetic film an be obtained which has a resistivity of at least more than 50 μΩ·cm and a maximum value of 98 μΩ·cm, and which has a saturated magnetic flux density Bs of at least 1.14 (T) and a maximum value of 1.55 (T).

In addition, when the composition ratio x of Fe to Ni of the $(Fe_xNi_y)_aRe_b$ alloy is set to 0.730, and the Re content b is changed from zero to 6.9 mass percent, a soft magnetic film can be obtained which has a resistivity of at least more than 34 μΩ·cm and a maximum value of 76 μΩ·cm, and which has a saturated magnetic flux density Bs of at least 1.75 (T) and a maximum value of 1.89 (T).

In addition, it is understood that the rate of decrease in saturated magnetic flux density Bs, which is obtained as the Re mass percent b is increased, is small when the composition ratio x of Fe to Ni of the $(Fe_xNi_y)_aRe_b$ alloy is large (when x is 0.730) as compared to the case in which the x is small (when x is 0.560). In consideration of this result together with that shown in FIG. 9, it is understood that when the composition ratio x of Fe to Ni of the $(Fe_xNi_y)_aRe_b$ alloy is large, the rate of decrease in saturated magnetic flux density Bs, which is obtained as the Re mass percent b is increased, is small as compared to the case in which the x is small at least in the range in which 0.560≦x≦0.730 is satisfied.

Figure 13:
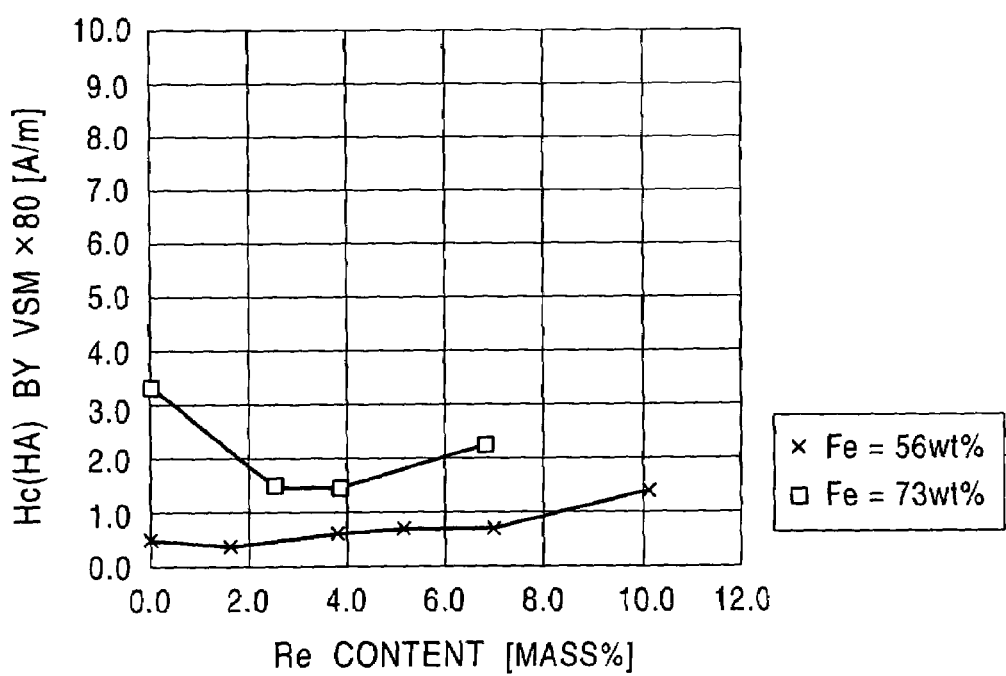
FIG. 13 is a graph showing the coercive force Hc in a magnetization difficult axis direction of a soft magnetic film composed of an $(Fe_xNi_y)_aRe_b$ alloy, which is obtained by changing the Re content b while the composition ratio x of Fe to Ni is set to 0.560 and 0.730.

FIG. 13 is a graph showing the coercive forces Hc of a soft magnetic film composed of an $(Fe_{0.560}Ni_{0.440})_aRe_b$ alloy, which is obtained by changing the Re content b while the composition ratio x of Fe to Ni is set to 0.560, and a soft magnetic film composed of an $(Fe_{0.730}Ni_{0.270})_aRe_b$ alloy, which is obtained by changing the Re content b while the composition ratio x of Fe to Ni in is set to 0.730. FIG. 14 is a graph of the coercive force measured by applying an external magnetic field to a soft magnetic film in a magnetization difficult axis direction.

According to the curve shown by □ in FIG. 13, when the Re content b of the $(Fe_{0.730}Ni_{0.270})_aRe_b$ alloy is in the range of from more than zero to 6.9 mass percent, the coercive force Hc in the magnetization difficult axis direction of a soft magnetic film composed of the $(Fe_{0.730}Ni_{0.270})_aRe_b$ alloy is 264 A/m or less. In particular, when the Re content b is in the range of from 2.4 to 6.9 mass percent, the coercive force Hc in the magnetization difficult axis direction of a soft magnetic film composed of the $(Fe_{0.730}Ni_{0.270})_aRe_b$ alloy is 184 A/m or less. Furthermore, when the Re content b is in the range of from 2.4 to 3.9 mass percent, the coercive force Hc in the magnetization difficult axis direction of a soft magnetic film composed of the $(Fe_{0.730}Ni_{0.270})_aRe_b$ alloy is 120 A/m or less.

According to the curve shown by x in FIG. 13, when the Re content b of the $(Fe_{0.560}Ni_{0.440})_aRe_b$ alloy is in the range of from more than zero to 10.1 mass percent, the coercive force Hc in the magnetization difficult axis direction of a soft magnetic film composed of the $(Fe_{0.560}Ni_{0.440})_aRe_b$ alloy is 120 A/m or less.

Next, the corrosion resistances of soft magnetic films composed of the $(Fe_{0.730}Ni_{0.270})_{93.1}Re_{6.9}$ alloy, an $(Fe_{0.750}Ni_{0.250})_{95.0}Re_{5.0}$ alloy, and the $Ni_{27}Fe_{73}$ alloy were measured.

After each of the soft magnetic films described above was formed on a wafer so as to have a thickness of 1 μm and was then immersed in saline (9 g of NaCl in 1 liter of water) at room temperature (23° C.) for 24 hours, the rate of generation of rust was observed. The results are shown in Table 5.

TABLE 5

| Thin Film Composition | $(Fe_{0.730}Ni_{0.270})_{93.1}Re_{6.9}$ | $(Fe_{0.750}Ni_{0.250})_{95.0}Re_{5.0}$ | $Ni_{27}Fe_{73}$ |
|---|---|---|---|
| Rusting Area percent | 0% | 20% | 0% |

From the results shown in Table 5, it is understood that the soft magnetic film composed of the FeNiRe alloy of the present invention has superior corrosion resistance to that of a soft magnetic film composed of an FeNiMo alloy which has been known as a soft magnetic film having a relatively high resistivity. In addition, when the Mo content of a soft magnetic film composed of an FeNiMo alloy is increased, the corrosion resistance is further degraded; however, the corrosion resistance of the soft magnetic film composed of the FeNiRe alloy of the present invention is not degraded even when the Re content of the soft magnetic film is increased.

In this example, the composition ratio of the FeNiRe alloy was measured by an inductively coupled plasma (ICP) method.

What is claimed is:

1. A soft magnetic film comprising an alloy which is represented by the formula FeNiRe
wherein the formula is represented by $(Fe_xNi_y)_aRe_b$, 0.54≦x≦0.58 and x+y=1 are satisfied when x and y are on a mass percent ratio basis, and 0<b≦1 0.1 and a+b=100 are satisfied when a and b are on a mass percent basis,
the soft magnetic film has a resistivity more than 50 to 98 μΩ·cm, and
the soft magnetic film has a saturated magnetic flux density Bs from 1.14 to less than 1.55 (T).

2. The soft magnetic film according to claim 1, wherein the soft magnetic film has a coercive force of 120 A/M or less.

3. A thin film magnetic head comprising:
a lower core layer composed of a magnetic material;
an upper core layer formed above the lower core layer with a magnetic gap provided therebetween;
a magnetic pole portion which is disposed between the lower core layer and the upper core layer, a width of the magnetic pole portion in a track width direction being smaller than that of each of the lower core layer and the upper core layer; and a coil layer applying a recording magnetic field to the two core layers, wherein at least one of the two core layers is composed of a soft magnetic film comprising an alloy which is represented by the formula FeNiRe, the magnetic pole portion is composed of a lower magnetic pole layer in contact with the lower core layer, an upper magnetic pole layer in contact with the upper core layer, and a gap layer located between the lower magnetic pole layer and the upper magnetic pole layer, or the magnetic pole portion is formed of an upper magnetic pole layer in contact with the upper core layer and a gap layer located between the upper magnetic pole layer and the lower core layer, and at least a part of the core layers, which is adjacent to the magnetic gap, comprises at least two magnetic layers, or at least one of the magnetic pole layers comprises at least two magnetic layers, and at least one of the magnetic layers, which is disposed away from the magnetic gap, is formed of the soft magnetic film.

4. The thin film magnetic head according to claim 3, wherein the lower magnetic pole layer is bulged.

5. The thin film magnetic head according to claim 4, wherein the lower magnetic pole layer is composed of the soft magnetic film comprising the FeNiRe alloy.

6. A thin film magnetic head comprising:

a lower core layer;

an upper core layer; and a magnetic pole portion located between the lower core layer and the upper core layer, a width of the magnetic pole portion in a track width direction being set to smaller than that of each of the lower core layer and the upper core layer, wherein the magnetic pole portion is formed of a lower magnetic pole layer in contact with the lower core layer, an upper magnetic pole layer in contact with the upper core layer, and a gap layer located between the lower magnetic pole layer and the upper magnetic pole layer, or the magnetic pole portion is formed of an upper magnetic pole layer in contact with the upper core layer and a gap layer located between the upper magnetic pole layer and the lower core layer, at least one of the upper magnetic pole layer and the lower magnetic pole layer is composed a soft magnetic film of an alloy which is represented by the formula FeNiRe, and wherein at least a part of the core layers, which is adjacent to the magnetic gap, comprises at least two magnetic layers, or at least one of the magnetic pole layers comprises at least two magnetic layers, and at least one of the magnetic layers, which is disposed away from the magnetic gap, is formed of the soft magnetic film.

* * * * *

UNITED STATES PATENT AND TRADEMARK OFFICE
CERTIFICATE OF CORRECTION

PATENT NO. : 7,113,367 B2
APPLICATION NO. : 10/660165
DATED : September 26, 2006
INVENTOR(S) : Hisayuki Yazawa et al.

It is certified that error appears in the above-identified patent and that said Letters Patent is hereby corrected as shown below:

In the Claims

Column 22, in claim 2, line 2, after "force of 120" delete "A/M" and substitute --A/m-- in its place.

Signed and Sealed this

Twenty-seventh Day of March, 2007

JON W. DUDAS
*Director of the United States Patent and Trademark Office*